(12) United States Patent
Rickman et al.

(10) Patent No.: US 9,946,042 B2
(45) Date of Patent: Apr. 17, 2018

(54) ELECTRONIC/PHOTONIC CHIP INTEGRATION AND BONDING

(71) Applicant: Rockley Photonics Limited, Marlborough, Wiltshire (GB)

(72) Inventors: Andrew Rickman, Marlborough (GB); Guomin Yu, Alhambra, CA (US); Aaron Zilkie, Pasadena, CA (US); Haydn F. Jones, Reading (GB)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 14/752,476

(22) Filed: Jun. 26, 2015

(65) Prior Publication Data

US 2016/0131862 A1    May 12, 2016

(30) Foreign Application Priority Data

Nov. 11, 2014  (GB) .................................. 1420063.8
Nov. 11, 2014  (GB) .................................. 1420064.6

(51) Int. Cl.
   *G02B 6/43*     (2006.01)
   *H04B 10/40*   (2013.01)
   (Continued)

(52) U.S. Cl.
   CPC ........... *G02B 6/43* (2013.01); *G02B 6/12019* (2013.01); *G02B 6/4295* (2013.01); *G02F 1/025* (2013.01);
   (Continued)

(58) Field of Classification Search
   CPC ................................................ G02B 6/12019
   See application file for complete search history.

(56) References Cited

U.S. PATENT DOCUMENTS 4,695,120 A   9/1987  Holder
6,614,949 B2  9/2003  Williams et al.
              (Continued)

FOREIGN PATENT DOCUMENTS

WO    WO 02/086575 A1    10/2002
WO    WO 2015/060820 A1   4/2015

OTHER PUBLICATIONS

UK Search Report for Application No. GB1512430.8, dated Oct. 12, 2015, 4 pages.
(Continued)

*Primary Examiner* — Omar R Rojas
(74) *Attorney, Agent, or Firm* — Lewis Roca Rothgerber Christie LLP

(57) ABSTRACT

An optical waveguide device comprising: one or more photonic chips, the one or more photonic chips including: a first portion of a photonic chip comprising an array of first components, each of the first components having an optical input and an electrical output; and a second portion of a photonic chip comprising an array of second components, each of the second components configured to receive an electrical input; the optical waveguide device further comprising: an integrated circuit; the integrated circuit forming an electrical bridge between the electrical outputs of the first components and respective electrical inputs of the second components; wherein the integrated circuit is directly mounted onto the one or more photonic chips; and/or wherein the integrated circuit is located between the first portion of a photonic chip and the second portion of a photonic chip.

21 Claims, 20 Drawing Sheets

(51) Int. Cl.
  *G02B 6/12* (2006.01)
  *G02F 1/025* (2006.01)
  *G02B 6/42* (2006.01)
  *G02B 6/35* (2006.01)

(52) U.S. Cl.
  CPC ............ *H04B 10/40* (2013.01); *G02B 6/356* (2013.01); *G02B 6/3548* (2013.01); *G02B 6/4279* (2013.01)

(56) References Cited

U.S. PATENT DOCUMENTS

| | | | |
|---|---|---|---|
| 6,768,827 B2 | 7/2004 | Yoo | |
| 7,116,851 B2* | 10/2006 | Welch | B82Y 20/00 |
| | | | 385/14 |
| 7,230,278 B2* | 6/2007 | Yamada | G02B 6/43 |
| | | | 257/80 |
| 7,257,283 B1* | 8/2007 | Liu | G02B 6/12004 |
| | | | 385/14 |
| 7,283,694 B2* | 10/2007 | Welch | B82Y 20/00 |
| | | | 372/26 |
| 7,295,783 B2* | 11/2007 | Singh | B82Y 20/00 |
| | | | 398/164 |
| 7,522,783 B2 | 4/2009 | Glebov et al. | |
| 7,978,030 B2 | 7/2011 | Lee et al. | |
| 8,373,259 B2 | 2/2013 | Kim et al. | |
| 8,493,976 B2 | 7/2013 | Lin | |
| 8,526,769 B1 | 9/2013 | Feng et al. | |
| 8,774,625 B2 | 7/2014 | Binkert et al. | |
| 8,798,409 B2 | 8/2014 | Pardo et al. | |
| 8,942,559 B2 | 1/2015 | Binkert et al. | |
| 9,160,685 B2 | 10/2015 | Somasundaram | |
| 9,307,302 B2 | 4/2016 | Ben-Shahar et al. | |
| 9,363,173 B2* | 6/2016 | Laor | H04L 49/10 |
| 2003/0091264 A1 | 5/2003 | Kimerling | |
| 2003/0219188 A1* | 11/2003 | Doi | G02B 6/2813 |
| | | | 385/3 |
| 2007/0297713 A1 | 12/2007 | Lu et al. | |
| 2008/0138088 A1 | 6/2008 | Welch et al. | |
| 2009/0022500 A1* | 1/2009 | Pinguet | G02B 6/1228 |
| | | | 398/164 |
| 2010/0266240 A1* | 10/2010 | Krishnamoorthy | G02B 6/43 |
| | | | 385/37 |
| 2012/0080672 A1 | 4/2012 | Rong et al. | |
| 2012/0207426 A1 | 8/2012 | Doany et al. | |
| 2013/0308898 A1 | 11/2013 | Doerr et al. | |
| 2013/0315599 A1 | 11/2013 | Lam et al. | |

OTHER PUBLICATIONS

Rylyakov et al., "Silicon Photonic Switches Hybrid-Integrated With CMOS Drivers," IEEE Journal of Solid-State Circuits, 47(1): 345-349, Jan. 2012.

Reed, G.T. et al., Silicon Optical Modulators, Materials Today, Elsevier Science, vol. 8, No. 1, Jan. 1, 2005, pp. 40-50.

International Search Report and Written Opinion issued in corresponding International Application No. PCT/EP2015/076362, dated Jan. 20, 2016, 14 pages.

U.K. Intellectual Property Office Examination Report, dated Aug. 10, 2017, for Patent Application No. GB1420064.6, 5 pages.

* cited by examiner

ELECTRONIC/PHOTONIC CHIP INTEGRATION AND BONDING

CROSS-REFERENCE TO RELATED APPLICATIONS

This application claims priority to Great Britain Application No. GB1420063.8, filed Nov. 11, 2014 and Great Britain Application No. GB1420064.6, filed Nov. 11, 2014. All of the above applications are incorporated by reference in their entirety.

FIELD OF THE INVENTION

The present invention relates to an optical waveguide device, particularly to an optical waveguide device comprising an array of components of a first type electrically connected to an array of components of a second type.

BACKGROUND OF THE INVENTION

For electrically driven optical devices such as optical modulator chips, it is desirable to minimize the power consumption. Reduction in the lengths of electrical connections and tracks from the driver to the optical modulator will reduce signal loss and lead to lower power consumption. In order to minimize power consumption, the lengths of electrical connections and tracks must be minimised throughout a device.

Optical modulators at high frequencies, such as microwave frequencies, typically have traveling wave transmission lines which have an impedance of 50 ohms. The transmission lines need 50-ohm termination resistors to operate effectively for impedance matching and this causes excessive power consumption. In order to minimize power consumption in this case, the optical modulators should be lumped elements without transmission lines. Furthermore, the lengths of electrical connections and tracks must be minimized.

Optical waveguide devices made in chip form are small and can be fast in operation. They can also be fabricated in volume at low cost. They are becoming increasing complex and multifunctional, and it is known to combine a number of features on a single photonic chip (for example on an SOI chip). The dimensions of such photonic chips (for example on the so-called 3 micron silicon platform) are large relative to the electronic chips that may need to be incorporated, and the resulting electrical track lengths can cause unacceptable losses.

In some complex planar photonic devices it becomes necessary either to create waveguide crossings where optical paths intersect, typically at 90 degrees. An alternative solution is to direct the light into another (parallel) plane. If light is directed from the chip, for example using a mirror to a photodiode on an adjacent chip, there are inevitable insertion losses and certain on chip features such as waveguide crossings give rise to high losses and of low yield. Also, the introduction of waveguide bends to allow effective low loss crossings can consume chip real estate. Where photonic chips include multiple detector remodulators comprising a plurality of detectors and a plurality of modulators, the presence of an input waveguide to each detector and each modulator leads to undesirable waveguide crossings. Examples are shown in FIGS. 1-3.

This invention seeks to overcome these problems and to enable faster and more compact devices with lower power consumption.

Electrical connections can be reduced by placing the electronic chip, such as a driver chip for a modulator, directly above the optical chip. Such a device is disclosed in U.S. Pat. No. 7,522,783.

Flip chipping is a technique for mounting electronic chips and has been used in the fabrication of optoelectronic devices. U.S. Pat. No. 7,978,030 discloses a high speed optical transponder in which the signal plane of a high speed circuit is flipped through non-coplanar interconnects with respect to a signal plane in a coplanar optical package; U.S. Pat. No. 6,614,949 discloses arrays of VCSELs flip-chipped to an ASIC in an optical communications interface; U.S. Pat. No. 8,373,259 discloses an optical alignment method for use when flipping an optical waveguide device onto a substrate; U.S. Pat. No. 8,798,409 discloses a flip-chip structure involving a laser chip in an optical transmitter; and US20121207426 shows a flip chip arrangement between an opto chip and an IC.

SUMMARY

The present invention aims to solve the problems discussed above by providing, according to a first aspect, an optical waveguide device comprising: one or more photonic chips, the one or more photonic chips including: a first portion of a photonic chip comprising an array of first components, each of the first components having an optical input and an electrical output; a second portion of a photonic chip comprising an array of second components, each of the second components configured to receive an electrical input; the optical waveguide device further comprising: an integrated circuit; the integrated circuit forming an electrical bridge between the electrical outputs of the first components and respective electrical inputs of the second components; wherein the integrated circuit is directly mounted onto the one or more photonic chips and/or wherein the integrated circuit is located between the first portion of a photonic chip and the second portion of a photonic chip.

In this way, a faster and more compact optical waveguide device with small power consumption is made possible.

The electrical contacts for contacting the first components may be located at one end of the integrated circuit, and the electrical contacts for contacting the second components located at the opposite end of the integrated circuit. This means that the first components on the photonic chip can be arranged so that the input waveguides to each of the first components do not cross with the input waveguides to each of the second components.

Optional features of the invention will now be set out. These are applicable singly or in any combination with any aspect of the invention.

The integrated circuit may be directly mounted onto the first portion of a photonic chip and/or the second portion of a photonic chip.

The first portion of a photonic chip that comprises the array of first components may be a first photonic chip, and the second portion of a photonic chip that comprises the array of second components may be a second photonic chip separate from the first photonic chip, such that the integrated circuit forms an electrical bridge between components on the first photonic chip and components on the second photonic chip.

Where the integrated circuit is located between the first portion of a photonic chip and the second portion of a photonic chip, the first portion may be a separate photonic chip to the second portion. When the first portion of a photonic chip is a separate chip to the second portion of a photonic chip (i.e. another of the one or more photonic chips), the integrated circuit may lie between the first portion and the second portion in the same plane or substantially the same plane as the first components and the second components.

Where the integrated chip is located directly onto the first portion and/or the second portion, the first portion and second portion may be part of the same photonic chip, or they could be separate photonic chips. By locating the integrated chip directly onto the portion of a photonic chip which contains the first/second components, a direct electrical connection may be formed in the vertical direction between each of the components and a corresponding electrical connector on the integrated circuit.

Alternatively, the portion of the photonic chip that comprises the array of first components may be part of the same photonic chip as the portion of the photonic chip that comprises the array of second components, such that the integrated circuit forms an electrical bridge between two parts of the same photonic chip.

Each of the first components may be a photodetector. Each photodetector being configured to convert an optical signal it receives into an electrical signal. The detector will therefore have an optical input in the form of a waveguide and an electrical output configured to be connectable to the integrated circuit.

Each of the second components may be a modulator. Each modulator being configured to: receive a wavelength tuned laser input from a tunable laser; receive an electrical signal from one of the detectors (via the integrated circuit); and to generate a modulated optical signal at the tuned wavelength, the modulated optical signal containing the information of the electric signal from the integrated circuit. Each modulator will therefore have an optical input in the form of a waveguide for receiving a tuned unmodulated optical input from a tunable laser. It will also have an electrical input configured to receive an electrical signal from the integrated circuit. Finally, each modulator will also include an optical output in the form of a waveguide for transmission of the modulated optical output.

Where each of the first components is a photodetector and each of the second components is a modulator, the integrated circuit forming an electronic bridge between each photodetector and a respective modulator. Each resulting detector-modulator pair functions as a detector remodulator.

The integrated circuit may be flip chip mounted onto at least one of the first portion of a photonic chip and the second portion of a photonic chip.

As an alternative to flip chip bonding of the integrated circuit chip to the photonic chip, the integrated circuit may include vias which provide electrical contact points on its base so that there is no need to flip the integrated circuit chip.

Alternatively, the integrated circuit may be located between the first portion of a photonic chip and the second portion of a photonic chip; wherein the integrated circuit is electrically connected to each of the first components and the second components by respective wire bonds.

Optionally, the first portion of a photonic chip is a portion of a first photonic chip and the second portion of a photonic chip is a portion of a second photonic chip, the second photonic chip being separate from the first photonic chip.

Optionally, the first portion of a photonic chip is a portion of a first photonic chip and the second portion of a photonic chip is a portion of the same photonic chip.

Optionally, the integrated circuit is located directly on the photonic chip but does not overlap vertically with either of the first components or the second components.

Each component in the array of first components may be displaced laterally with respect to adjacent first components such that the array of first components and waveguides has a spaced apart or stepped arrangement The components in the array of first components may all lie within the same plane of the photonic chip. The "stepped arrangement" is an arrangement in which components are displaced relative to one another such that they align along a direction which is at a diagonal to the direction of input waveguides and/or diagonal to any output electrical connections. The displacement of adjacent components (i.e. the step size of the stepped arrangement) will be chosen based on the real estate available on the chip. For example, it may be no more than 200 µm, it may be no more than 100 µm. Alternatively, it may be more than or equal to 100 µm or more than or equal to 200 µm.

Where there is no lateral displacement (i.e. where there is a 0 µm step size), the components lie side-by-side in a linear array which is perpendicular to the input waveguides.

Each component in the array of second components may be displaced laterally with respect to adjacent second components such that the array of second components has a stepped arrangement. Again, the displacement of adjacent components (i.e. the step size) may, for example, be no more than 200 µm, it may be no more than 100 µm. Alternatively, it may be more than or equal to 100 µm or more than or equal to 200 µm.

The stepped arrangement of the array of first components will give rise to a spaced relationship between a given first component and its neighbours within the array. Preferably, the second component which is electrically connected to the given first component will exhibit the same spaced relationship with its neighbouring components in the array of second components.

The length of the electrical connection between each first component and its respective second component may be equal to the length of the electrical connection between each of the other first components and their respective second components.

Electrical connections between a first component and a second component may be transverse to the direction of the input waveguides of the first components.

There may be four or more first components in the array of first components and four or more second components in the array of second components.

The integrated circuit is preferably a single chip and may be an application-specific integrated circuit (ASIC) which contains at least trans-impedance amplifier (TIA), Limiting Amplifier and modulator driver.

Optionally, the first components are photodetectors, the second components are modulators, and the integrated circuit is an ASIC which electrically connects the photodetectors with the modulators to form a plurality of detector remodulators.

Optionally, the optical signals received by the photodiodes (generally photodetectors) are from optical packet switches, and the ASIC includes a packet processor for processing the packet information it receives from the photodetectors before sending the electrical signals to the modulators.

Optionally, the integrated circuit includes a wavelength tuner which controls the wavelength of a wavelength tuned laser of one or more of the modulators.

According to a second aspect, there is provided an optical waveguide switch comprising: an arrayed waveguide grating (AWG); and an optical waveguide device according to the first aspect; the optical waveguide device optically connected to the inputs of the AWG for controlling the wavelength of an optical signal at an input of the AWG and therefore for controlling the path taken by the optical signal through the AWG.

Optionally, the optical waveguide further comprises an additional optical waveguide device according to the first aspect, the inputs of the additional optical waveguide device configured to be optically connected to the outputs of the AWG.

Further optional features of the invention are set out below.

BRIEF DESCRIPTION OF THE DRAWING

Embodiments of the invention will now be described by way of example with reference to the accompanying drawings in which.

DETAILED DESCRIPTION

Figure 1:
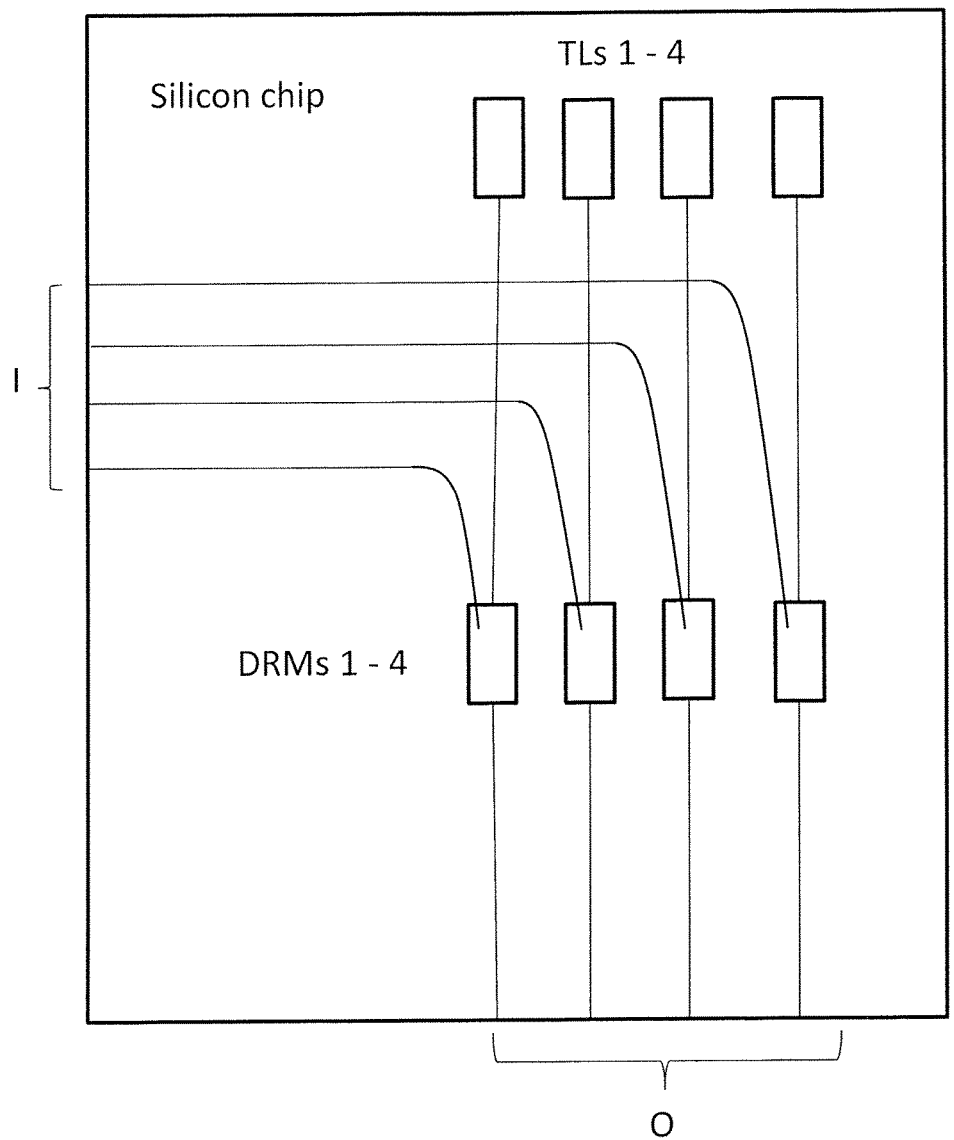
FIG. 1 is a schematic diagram of an optical waveguide device.
Figure 2:
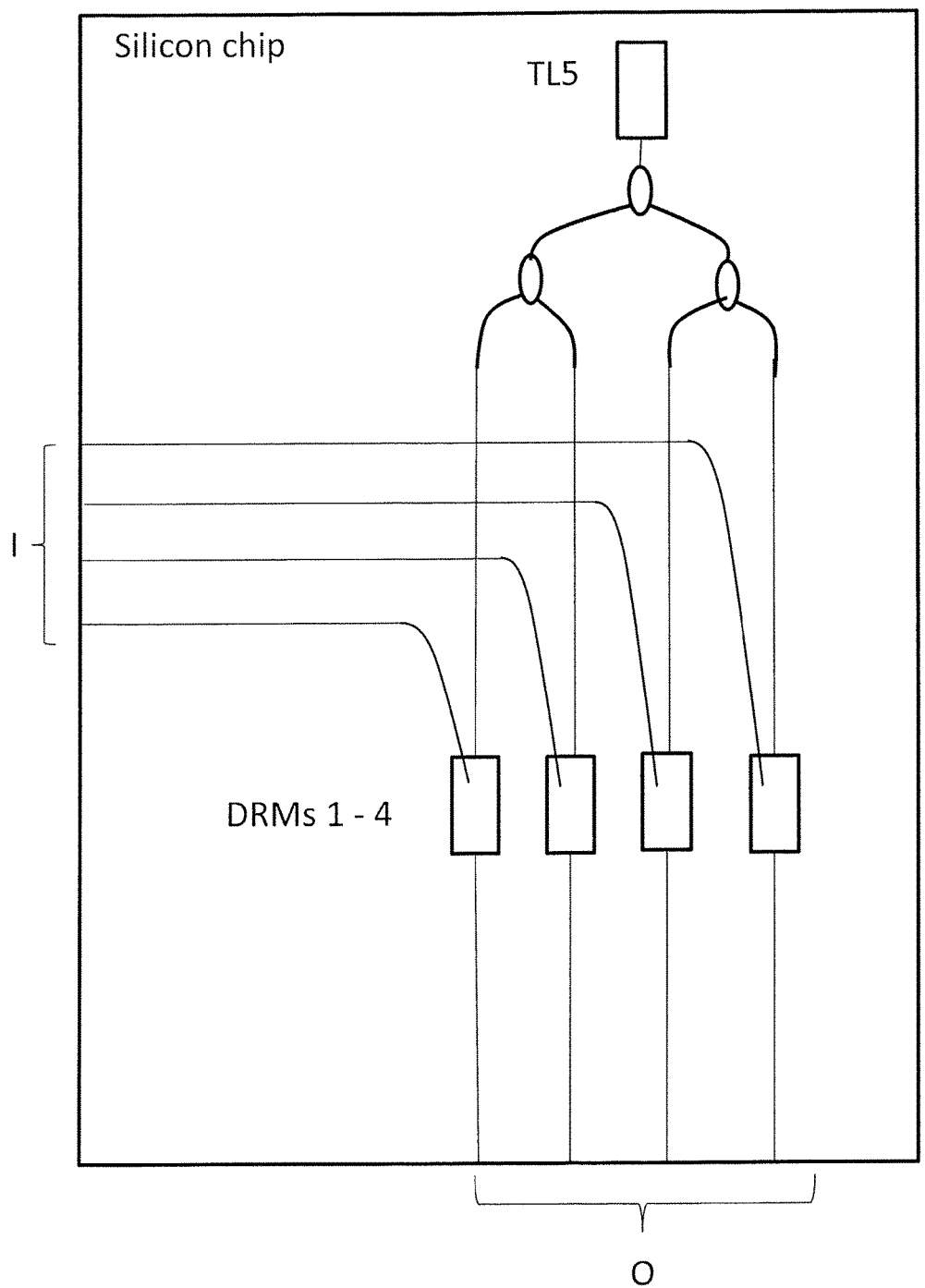
FIG. 2 is a schematic diagram of an alternative optical waveguide device.
Figure 3:
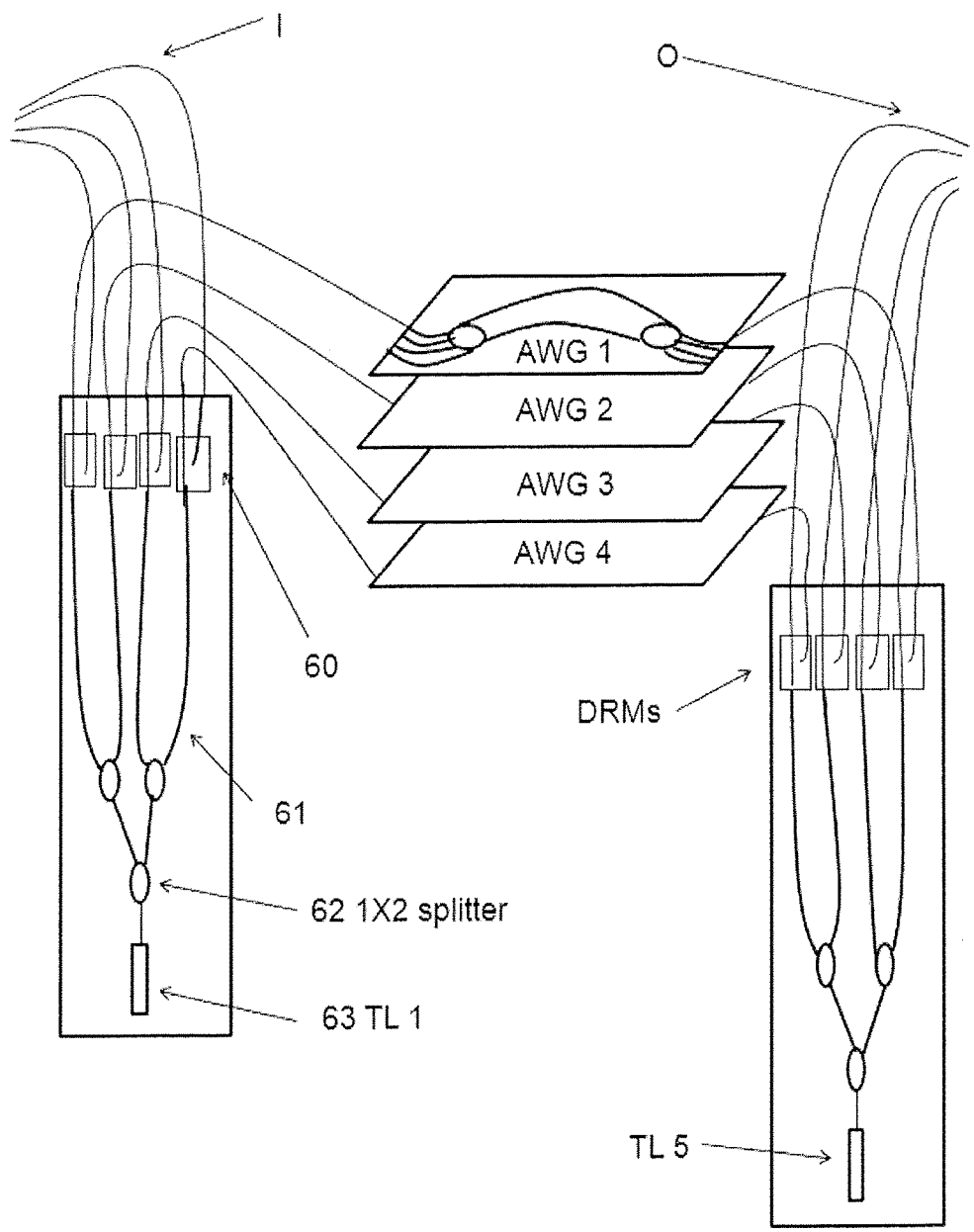
FIG. 3 is a schematic diagram of an optical waveguide switch.

FIGS. 1, 2 and 3 depict optical waveguide devices on silicon on insulator chips for use in optical switching. The optical components shown are configured to transpose an optical signal from a first optical signal of a first channel or wavelength to a second optical signal of a second channel or wavelength.

As shown in FIGS. 1 and 2, a plurality of detector remodulators (DRMs 1-4) may be used, each detector remodulator configured to convert the first optical signal (of a first wavelength) to the second optical signal (carrying the same information but having a second wavelength). Each detector remodulator involves the detection of the first signal in which the first (modulated) signal is converted into an electrical signal, followed by the modulation of light of a second (unmodulated) wavelength/channel by the (modulated) electrical signal.

The (unmodulated) first optical signal which feeds each of the DRMs is provided by a tunable laser (TLs 1-4). In the example shown in FIG. 1, a plurality of tunable lasers (TLs 1-4) each provide an unmodulated, wavelength tuned input to a respective DRM. The example shown in FIG. 2 differs in that a single tunable laser (TL5) provides the input to each of a plurality of DRMs (DRMs 1-4) by way of waveguide splitters. The waveguide splitters may include a first 1×2 splitter followed by two further 1×2 splitters.

Whilst in the electrical domain of the DRM, the signal may advantageously be processed, for example by one or more of amplification, reshaping, re-timing, and filtering in order to provide a clean signal to be applied to the second wavelength/channel The photonic chip containing the detector remodulator may comprise a silicon on insulator (SOI) waveguide platform including: a detector coupled to a first input waveguide; a modulator coupled to a second input waveguide and an output waveguide; and an electrical circuit connecting the detector to the modulator; wherein the detector, modulator, second input waveguide and output waveguide are arranged within the same horizontal plane as one another; the modulator including a modulation waveguide region. The modulation region may be a phase modulation region or an amplitude modulation region at which a semiconductor junction (PN, or PIN) is set across the waveguide.

The semiconductor junction should be understood to correspond to any one junction or number of junctions between different regions having different semiconductor Fermi energy levels thereby forming an opto-electronic region. The semiconductor junction may or may not include an intrinsic region.

The close proximity of the optical detector and the modulator is important.

FIG. 3 depicts a further development in which the DRMs are employed as part of an optical switch, most particularly an optoelectronic packet switch. In this switch development, an electronic circuit connects the optical detector and modulator.

For cost and ease of fabrication, it is often desirable for the photonic chip to be fabricated with the components located within the same plane as one another. However, as can be seen in FIGS. 1 and 2, in such a device, if all of the optical waveguides were to be coplanar, waveguide crossings would be necessary.

Figure 5:
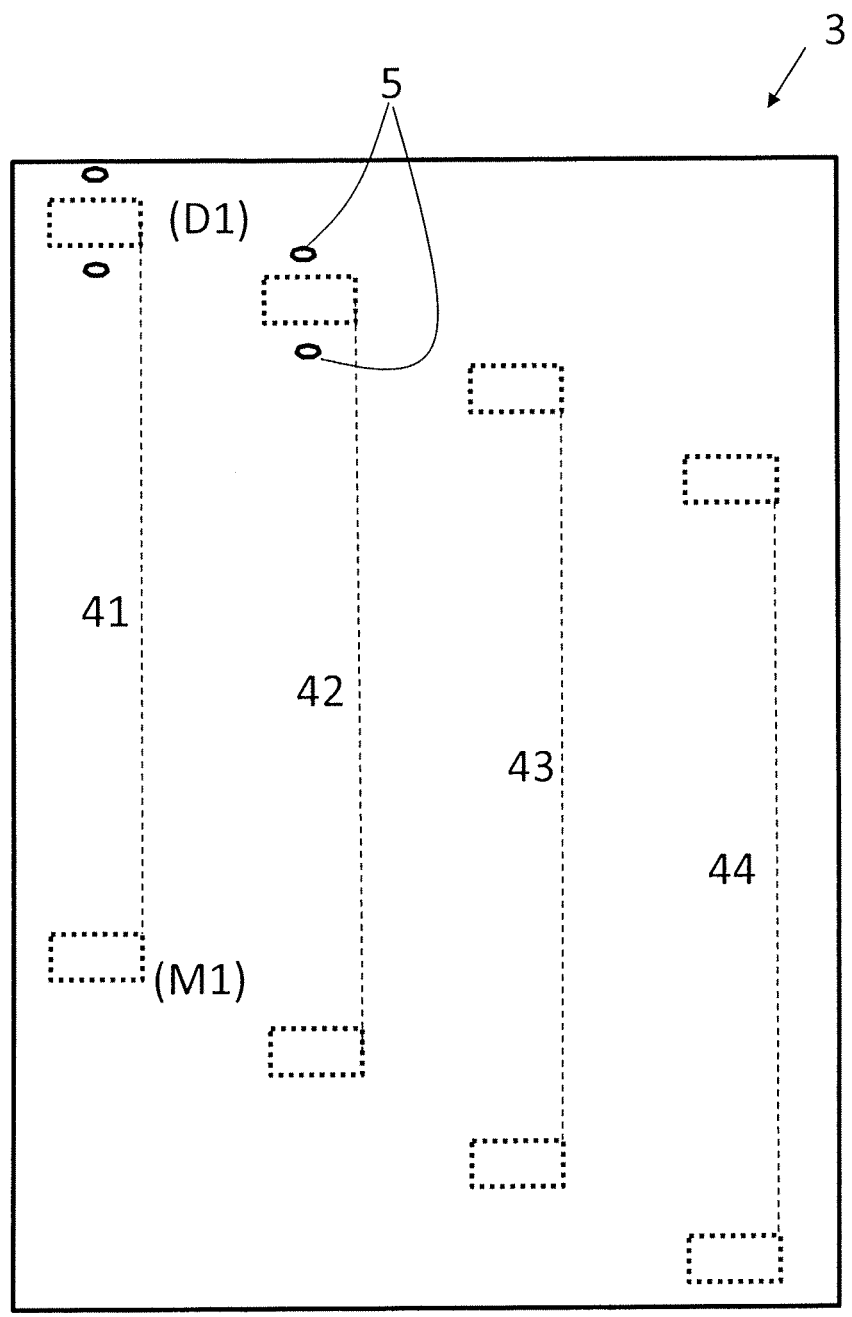
FIG. 5 shows a schematic diagram of an example of an integrated circuit which forms part of the optical waveguide device.
Figure 6:
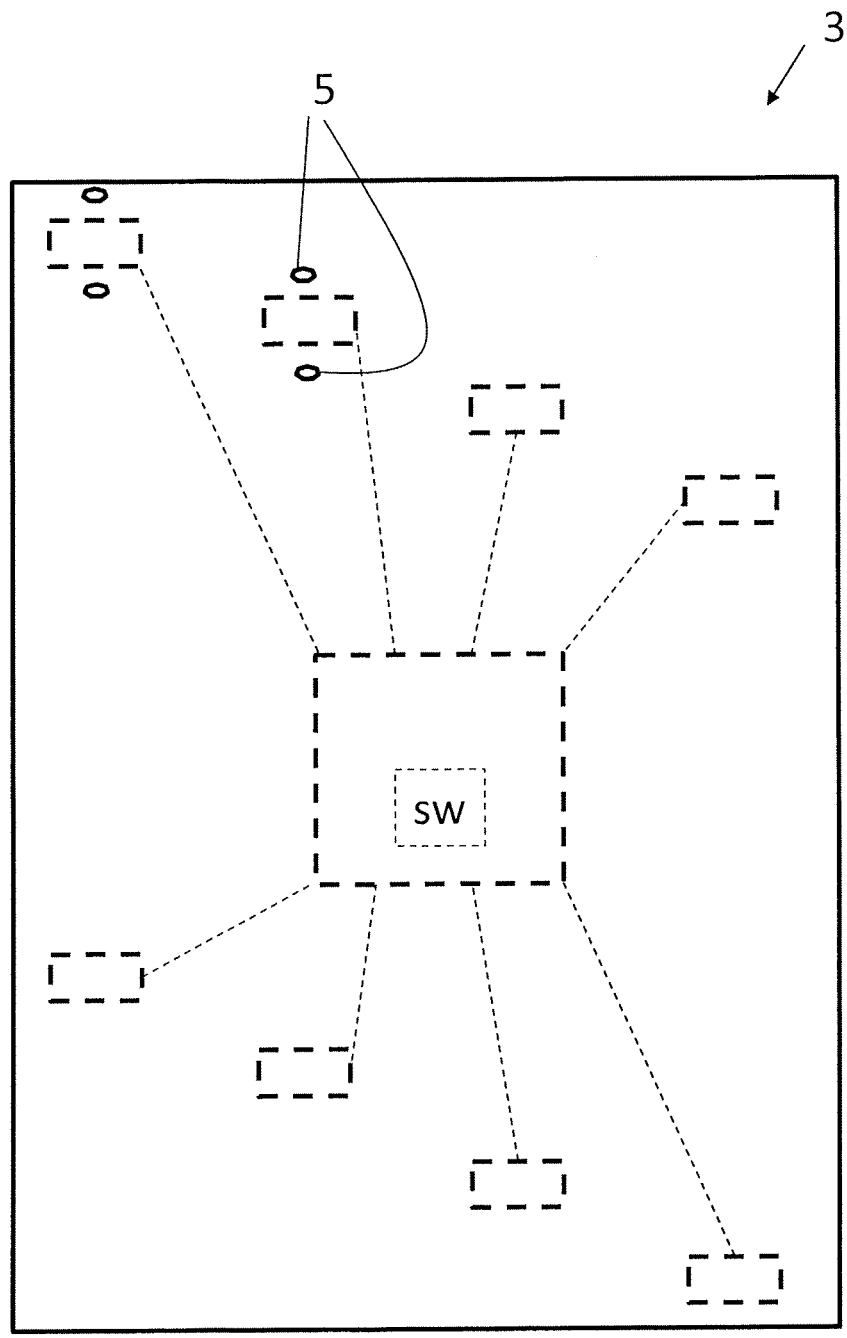
FIG. 6 is a schematic diagram of an alternative example of an integrated circuit which forms part of the optical waveguide device.

A first embodiment of an optical waveguide device according to the present invention, designed to avoid undesirable waveguide crossings, is described with reference to FIGS. 4a, 4b, 4c, 4d, 5 and 6. FIGS. 4a, 4b, 4c and 4d each show an example of a waveguide layout. FIGS. 5 and 6 show two examples of flip chip The optical waveguide device 1 comprises a photonic chip 2, the photonic chip including a first portion having an array of first components, the first components being a plurality of photodetectors D1, D2, D3, D4. Each of the photodetectors has an optical input in the form of a waveguide input 11, 12, 13, 14. Each input waveguide could run between the edge of the photonic chip to the input of the photodetector as shown. Alternatively (not shown) each input waveguide could extend from a fiber interface to the photodetector.

The photonic chip 2 also includes a further portion which comprises an array of second components M1, M2, M3, M4. Each of the second components is a modulator having an optical input in the form of an input waveguide 21, 22, 23, 24 for receiving an unmodulated wavelength tuned optical input. Each modulator is also configured to receive an electrical signal. In addition, each modulator is connected to an optical output in the form of an output waveguide 31, 32, 33, 34, for transmitting the modulated wavelength tuned optical signal generated by the modulator.

An integrated circuit (IC) 3 is flip-chip mounted onto the photonic chip to form an electrical bridge between each one of the first components and a respective one of the second components. In this embodiment, where the first components are photodetectors and the second components are modulators, the integrated circuit matches each photodetector with a respective modulator via an electrical connections 41, 42, 43, 44 to create a detector-modulator pair i.e. a detector remodulator.

In the embodiment shown in FIG. 5, the electrical connections each lie in a direction which is perpendicular (or at least substantially perpendicular) to the directions of the input and output waveguides of the photodetectors and modulators.

The components (photodetectors and modulators) all lie within the same plane of the photonic chip. In the embodiments shown in FIGS. 4a and 4b, the components are positioned in a "stepped arrangement", each photodetector component having a laterally displaced location relative to the adjacent photodetectors in the array. In such a stepped arrangement, the step size may be any number such as 100 μm, 200 μm, or more. When viewed from above, the photodetectors are aligned along a direction which is at a diagonal to the direction of input waveguides 11, 12, 13, 14 and also at a diagonal to the electrical connections 41, 42, 43, 44 of the IC.

Figure 4A:
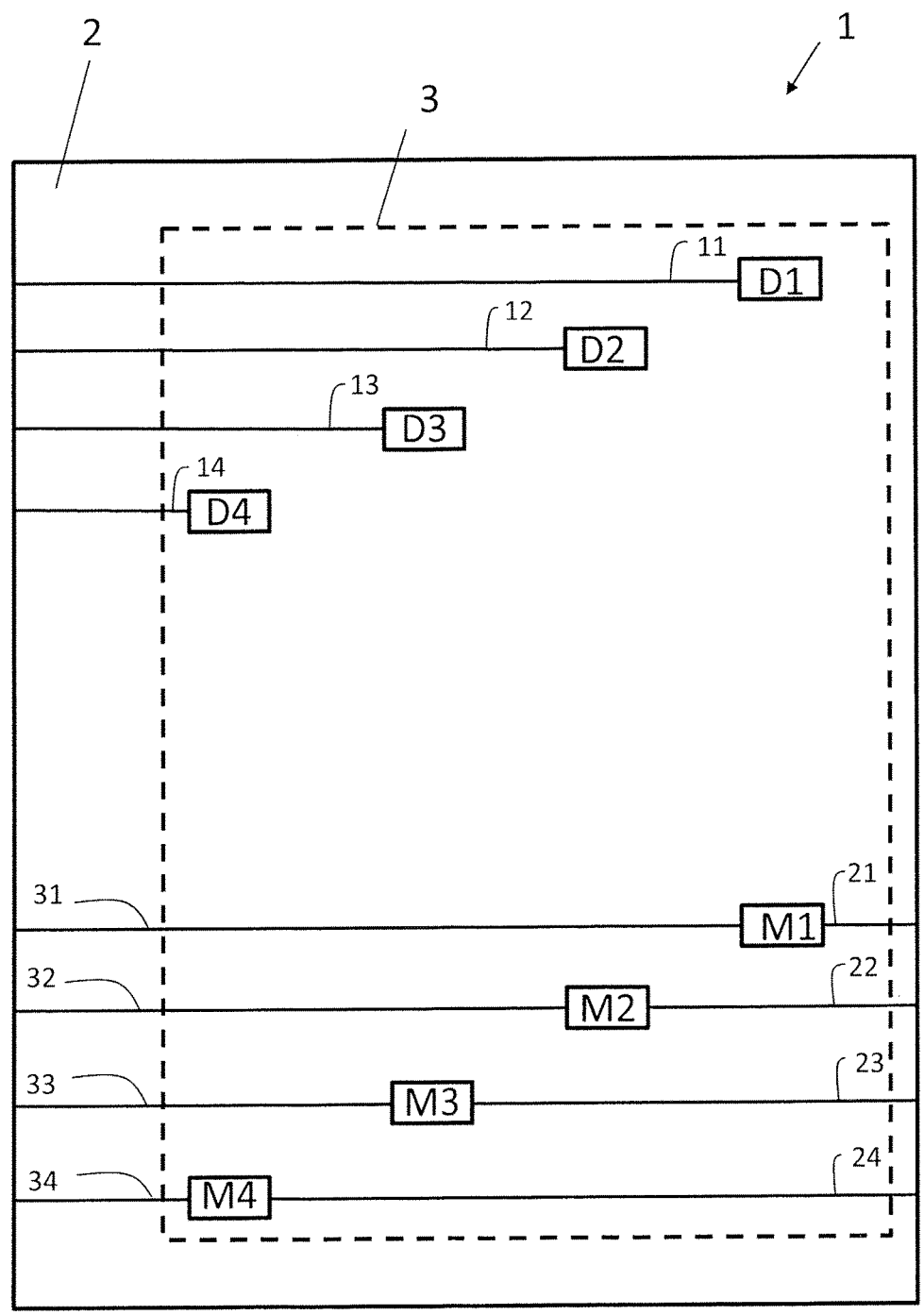
FIG. 4a shows a schematic diagram of an example of an optical waveguide device with detectors and modulators arranged in a stepped configuration.
Figure 4B:
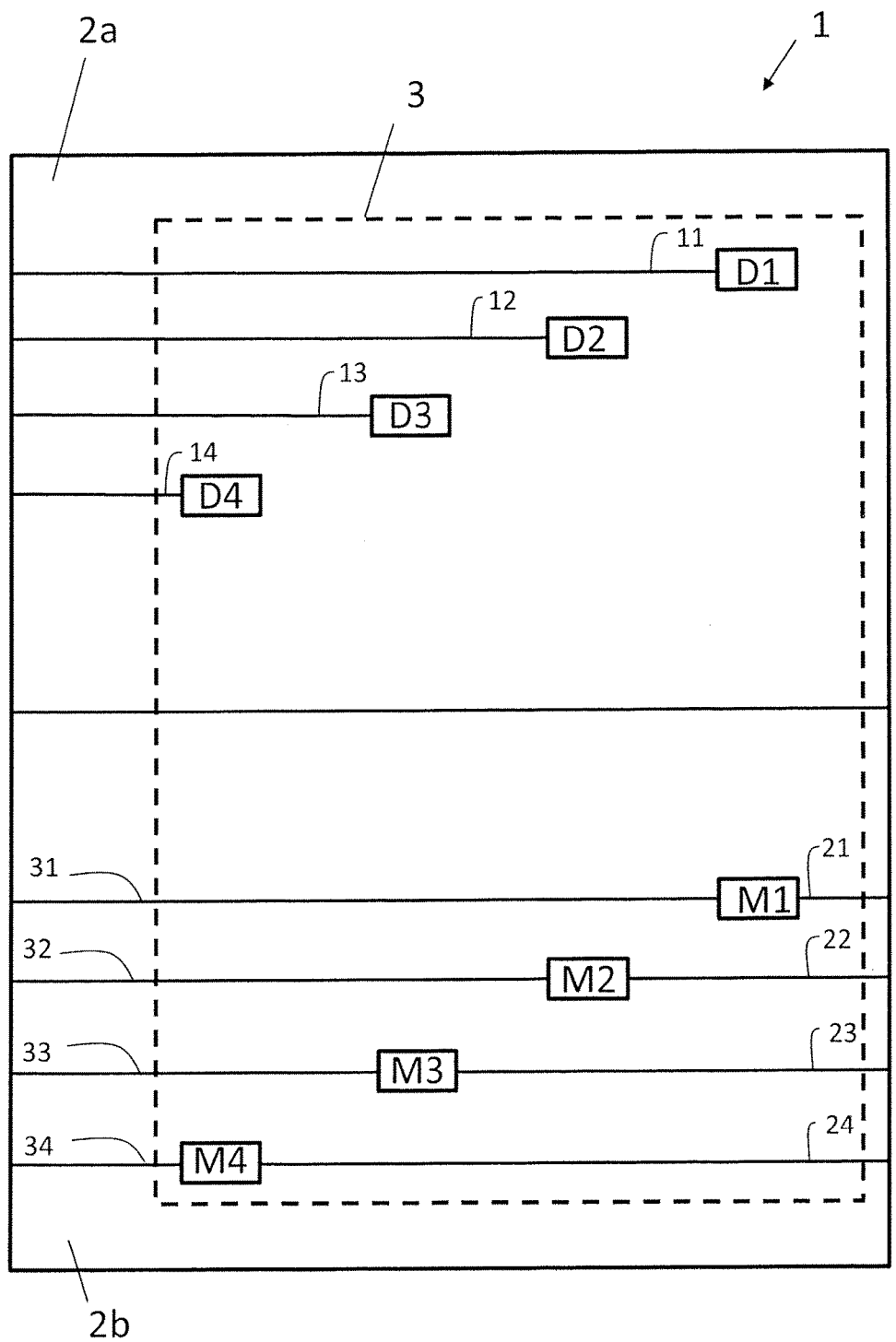
FIG. 4b shows a schematic diagram of an example of an optical waveguide device with detectors and modulators arranged in another stepped configuration.

Again referring to the embodiments shown in FIGS. 4a and 4b, each component in the array of second components is displaced laterally with respect to adjacent second components such that the array of second components has a stepped arrangement. Again, the step size may be any number such as 100 μm, 200 μm, or more.

In the embodiment of FIG. 4a, the first portion (which contains the first components) and second portion (which contains the second components) are part of the same photonic chip 2. By locating the integrated chip 3 directly onto the portion of a photonic chip which contains the first/second components, a direct electrical connection is formed in the vertical direction between each of the components and a corresponding electrical connector on the integrated circuit.

The embodiment of FIG. 4b differs from that of 4a only in that the first portion 2a is a separate photonic chip to the second portion 2b.

Figure 4C:
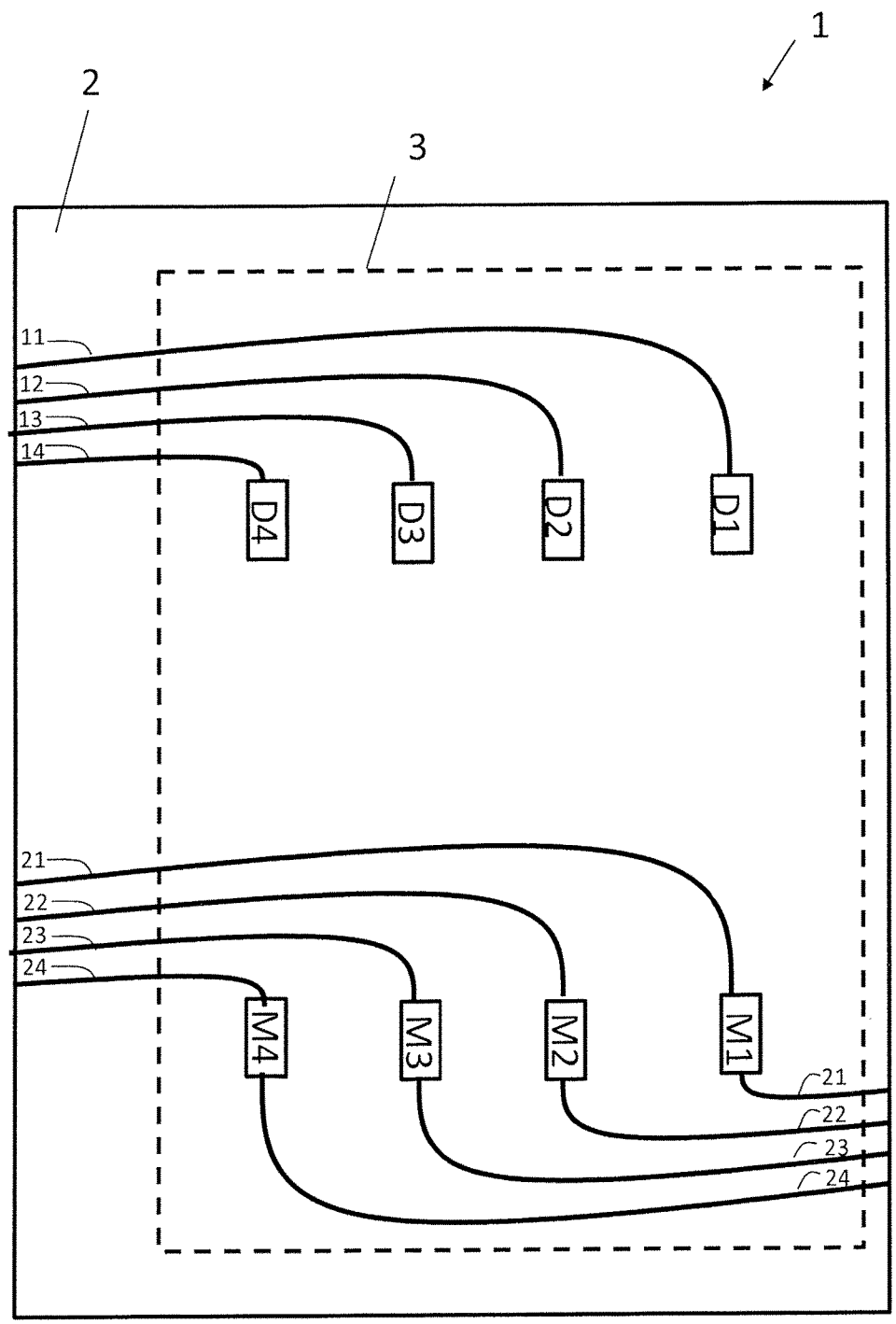
FIG. 4c shows a schematic diagram of an example of an optical waveguide device with detectors and modulators arranged in a linear configuration.
Figure 4D:
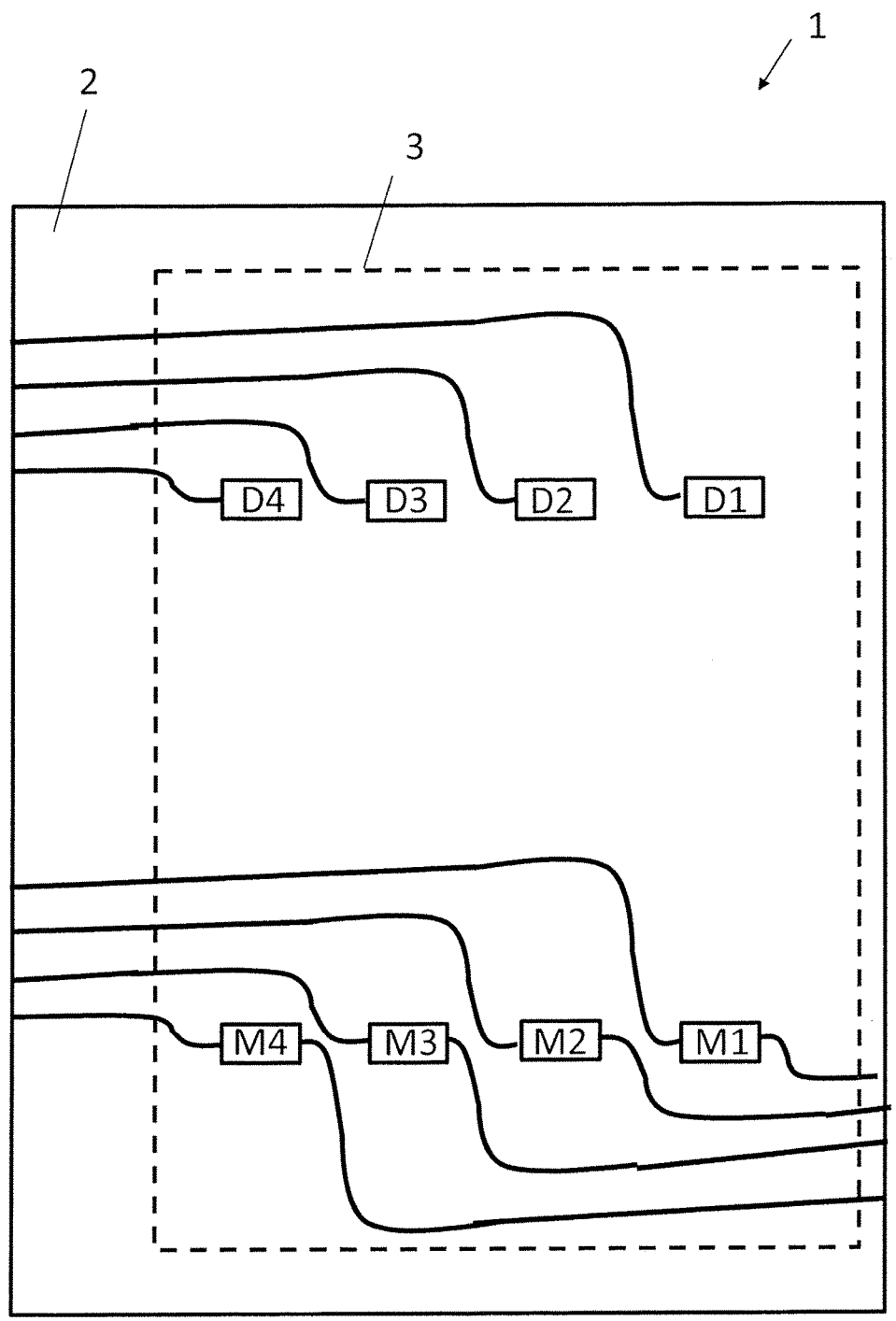
FIG. 4d shows a schematic diagram of an example of an optical waveguide device with detectors and modulators arranged in another linear configuration.

The components may alternatively be positioned in a non-stepped arrangement as shown in FIGS. 4c and 4d (i.e. the "step size" is 0 μm). In these arrangements, both the photodetectors and the modulators are positioned side-by-side in a line, the line being perpendicular to the input waveguides. In FIG. 4B, the orientation of each photodetector and each modulator is such that its longitudinal axis is aligned with the longitudinal axis of the flip chip. In FIG. 4C, the orientation of each photodetector and each modulator lies perpendicular to the longitudinal axis of the flip chip.

The stepped arrangement of the array of first components in FIGS. 4a and 4b gives rise to a spaced relationship between a given first component and its neighbours within the array. Preferably, the second component which is electrically connected to the given first component will exhibit the same spaced relationship with its neighbouring components in the array of second components.

The stepped arrangement enables the lengths of electrical connections to be minimised whilst increasing the separation distance of the detectors in the array relative to one another and also increasing the separation distance of modulators relative to one another within the array or modulators. By increasing the inter-component spacing, the fabrication of components on the photonic chip is made easier and the risk of cross-talk minimised.

As shown in FIG. 5, the length of the electrical connection between each first component and its respective second component may be equal to the length of the electrical connection between each of the other first components and their respective second components. Electrical connections between a first component and a second component may be transverse to the direction of the input waveguides of the first components.

The distance between a detector and its respective modulator is preferably less than 1 cm, more preferably less than 1 mm, and even more preferably less than 100 μm.

The IC may be bonded to the photonic chip(s) in any orientation and electrical connections made to the photonics chip using vias or wire-bonding but preferably the IC will be flip chip bonded to the photonics chip.

The embodiment shown in FIG. 6 differs from the embodiment of FIG. 5 in that electrical connections between detectors and modulators are made via a central switch mechanism, SW. The switching arrangement gives rise to extra flexibility and the switch itself may be configured to have a relatively slow speed suitable for device set-up or reconfiguration. Alternatively or additionally, the switch may be configured to carry out fast switching of packets for data switching/routing.

Figure 7:
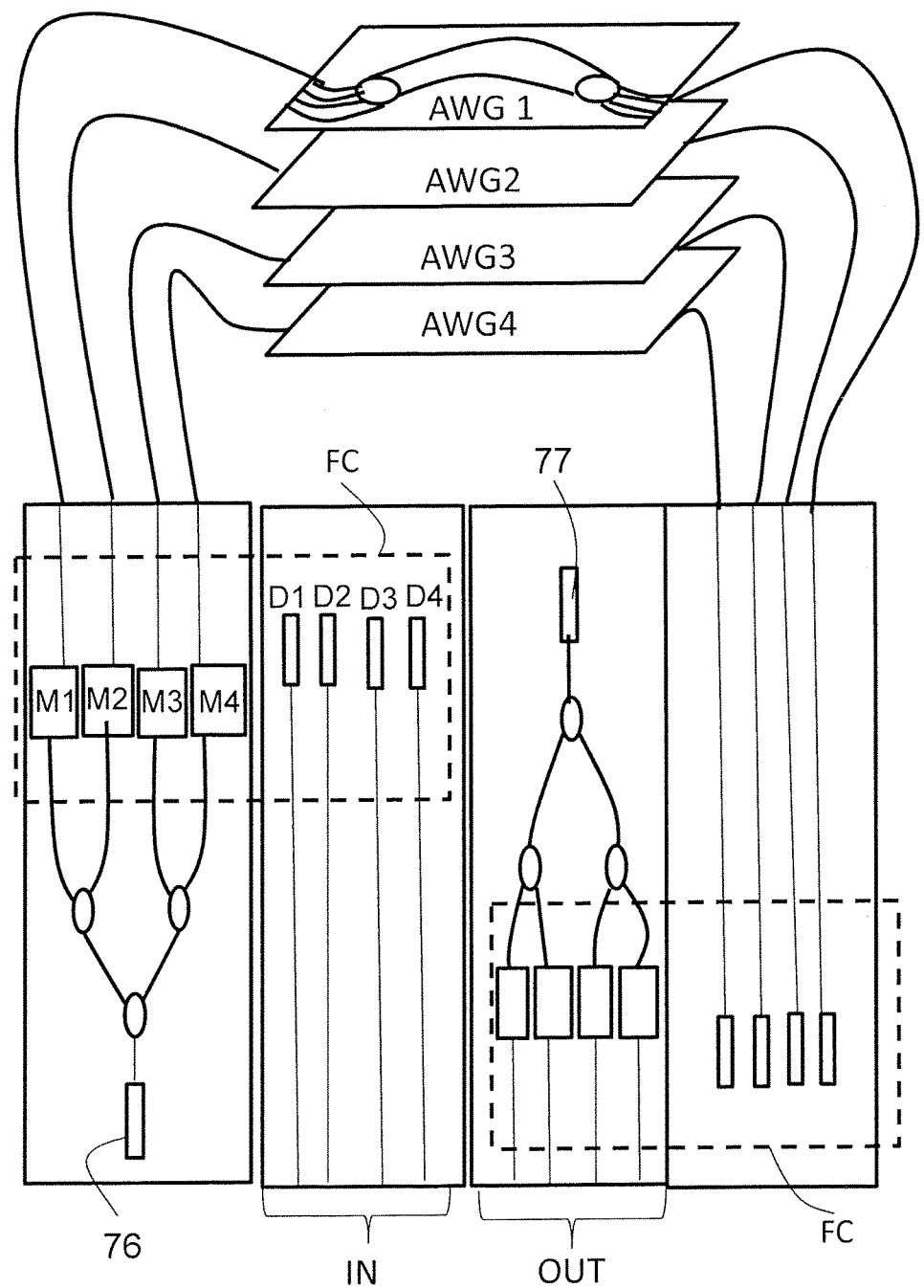
FIG. 7 is an optical waveguide switch including optical waveguide devices according to the present invention.

An optical waveguide switch incorporating the optical waveguide device is shown in FIG. 7. The optical waveguide switch comprises an arrayed waveguide grating AWG with an optical waveguide device (such as those described in relation to FIGS. 4a-6) located at the input of the AWG, and a further optical waveguide device located at the exit of the AWG.

The outputs of the modulators of the first optical waveguide device are optically connected to the inputs of the AWG. In this way, the DRMs of the optical waveguide device are capable of controlling the wavelength of an optical signal at an input of the AWG and therefore for controlling the path taken by the optical signal through the AWG.

The inputs of the detectors of the further optical waveguide device are optically connected to the outputs of the AWG. In this way, the DRMs of the further optical waveguide device are capable of controlling the wavelength of an optical signal at an input of the AWG and therefore for adjusting the wavelength of the data signal once it has reached the desired end location (i.e. the desired output port of the AWG).

In the embodiment shown in FIG. 7 there are four layers of AWGs capable of processing four ports of signals in parallel.

Input waveguides provide a modulated optical signal to each of 4 detectors D1, D2, D3, D4 on a first photonic chip. These signals are converted into electrical signals at the detectors, and the integrated flip-chipped circuit FC connects this electrical signals to the electrical inputs of modulators M1, M2, M3, M4 on a second photonic chip. One tunable laser provides the unmodulated optical signal to all four of the modulators via waveguide splitters.

The modulated, wavelength tuned optical signal output from each modulator is sent to a respective one of the four AWGs and the path through that AWG will depend on the wavelength chosen.

These four signals are processed in parallel, and they are recombined after being transmitted through the AWGs.

The simplifying nature of this approach may be seen by comparing FIG. 7 with FIG. 3. In FIG. 3 is shown an example in which there are fiber connectors at the chip edge for the optical signals in and optical signals out (directed to the AWGs). The device shown in FIG. 7 can be connected along one edge only and the inputs and outputs to the device are greatly simplified.

The embodiments of the optical waveguide device described above all contain four detectors, four modulators and four AWGs. However, it should be understood that the number of components could be scaled up or scaled down to any other suitable number.

Figure 8:
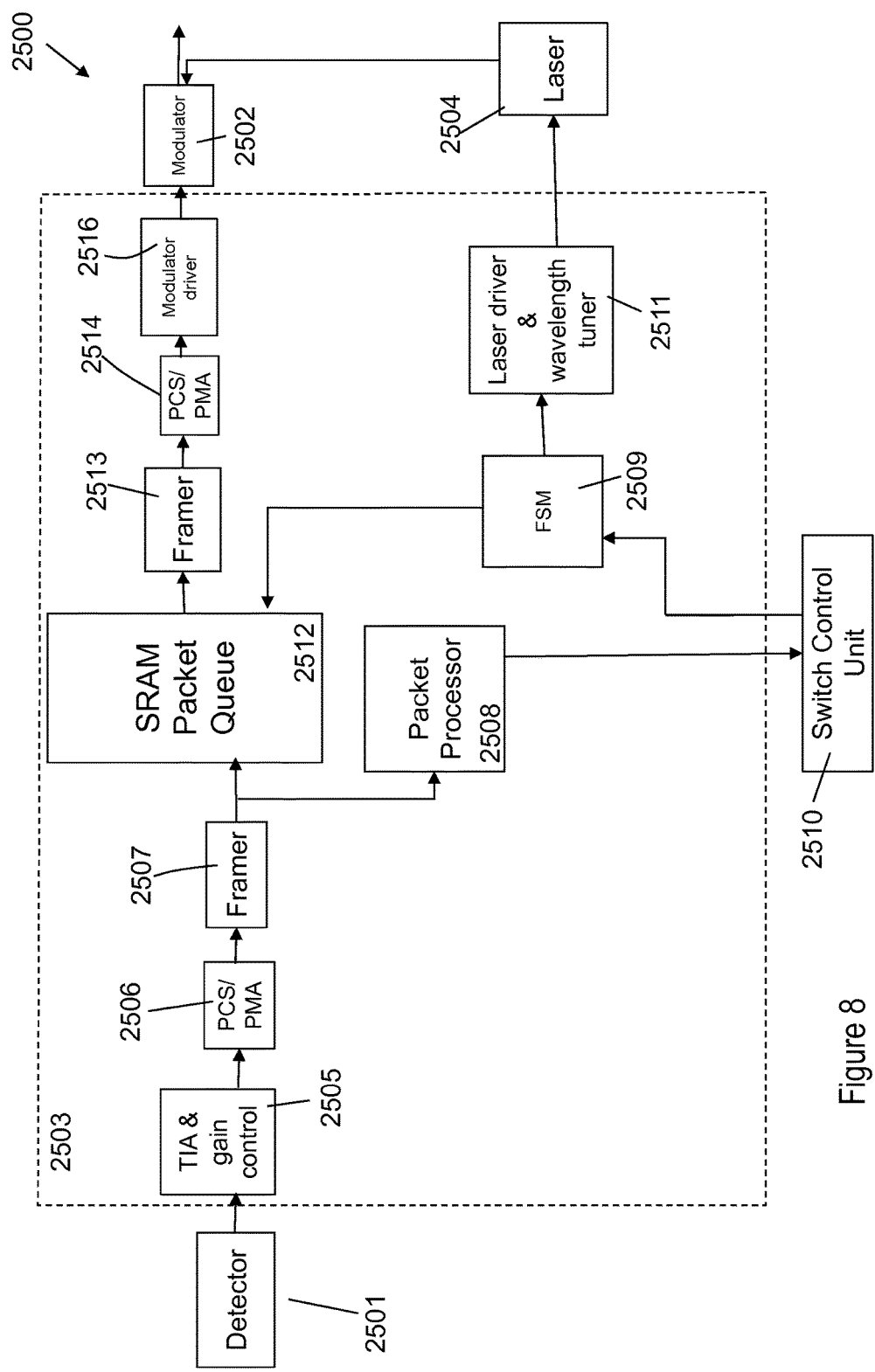
FIG. 8 is a schematic diagram of an example of an integrated circuit of a detector remodulator (DRM) optical waveguide device, the optical waveguide device forming part of an optoelectronic packet switch.
Figure 9:
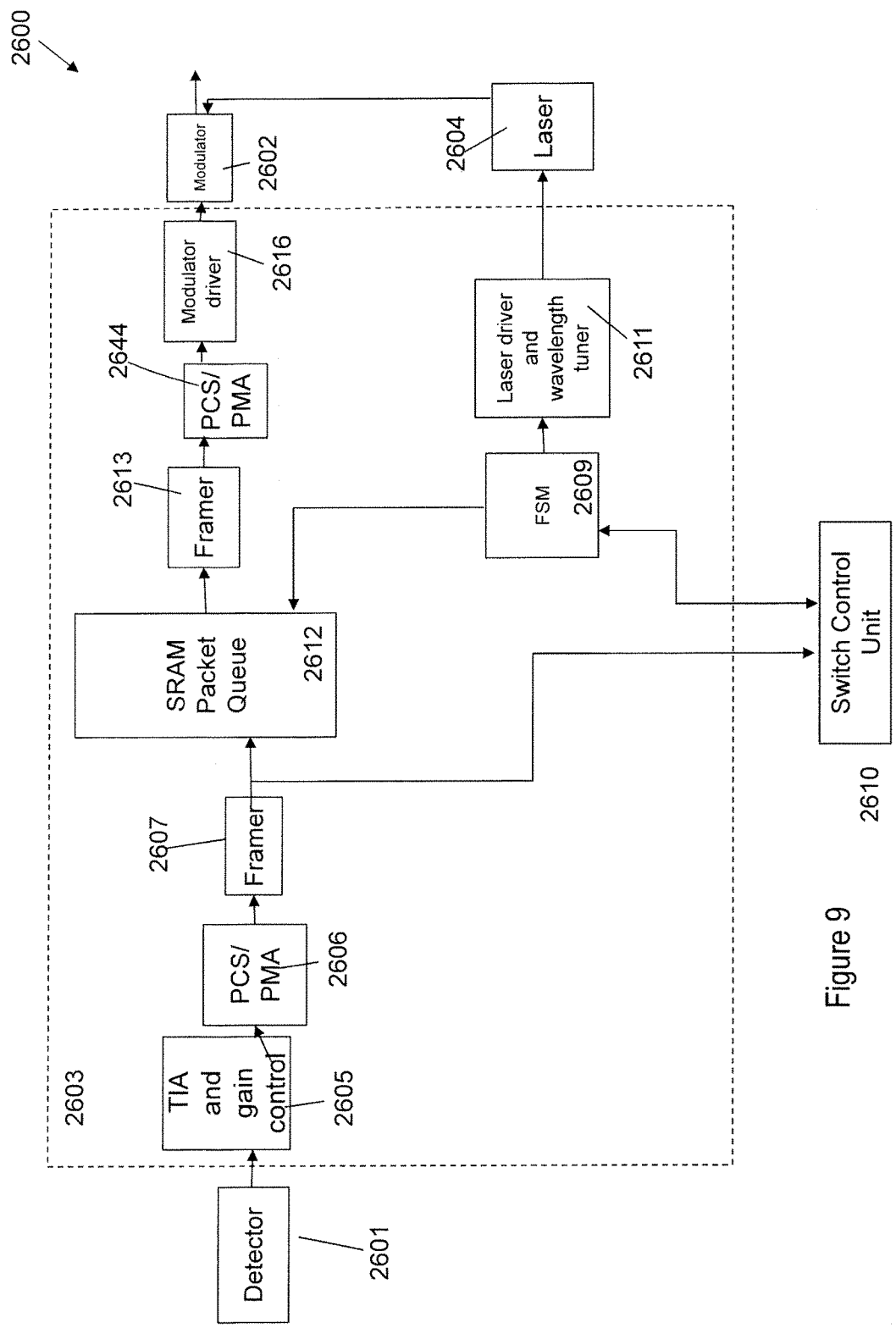
FIG. 9 is a schematic diagram of an alternative example of an integrated circuit of a detector remodulator (DRM) optical waveguide device, the optical waveguide device forming part of an optoelectronic packet switch.
Figure 10:
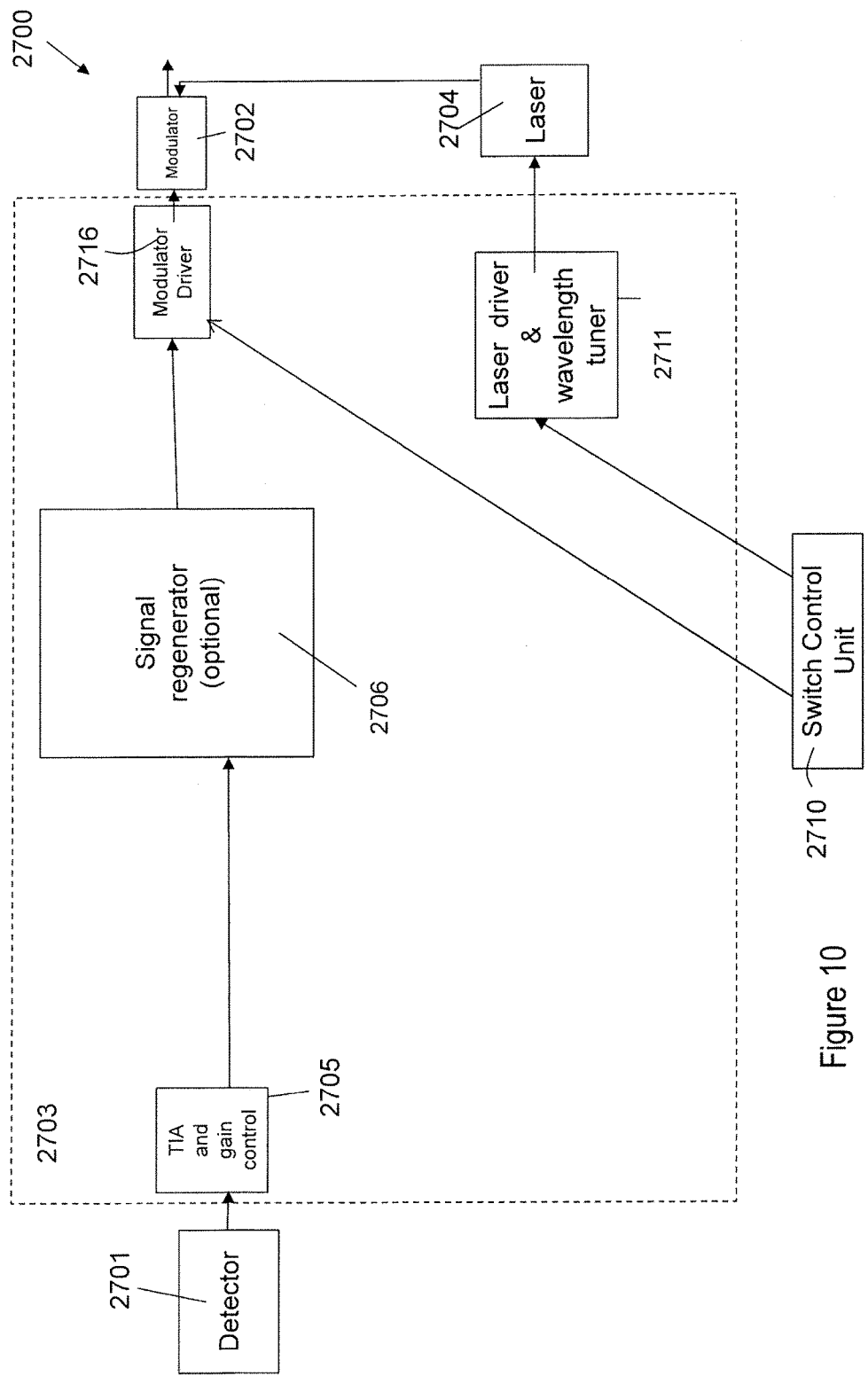
FIG. 10 is a schematic diagram of an example of an integrated circuit of a detector remodulator (DRM) optical waveguide device, the optical waveguide device forming part of an optoelectronic circuit switch.

As described in more detail below, FIGS. 8 and 9 show some of the functions that may be performed by a flip-chipped IC in the context of a DRM used in an optoelectronic packet switch. FIG. 10 shows a schematic diagram of the functions that may be performed by a flip chipped IC in the context of a DRM used in an optoelectronic circuit switch.

A schematic diagram of a DRM for an optoelectronic packet switch is shown in FIG. 8. The DRM 2500 comprises: a detector 2501; a modulator 2502; and an electronic circuit 2503 which forms an electrical connection between the detector and the modulator via a number of additional components. A tunable laser 2504 is located outside of the electrical circuit as a separate component from the modulator 2502 and provides the modulator with a wavelength tuned but unmodulated laser signal.

The electronic circuit includes laser wavelength tuner module 2511 configured to send tuning signals to the tunable laser. The tunable laser is configured to generate a wavelength tuned (but unmodulated) laser light signal which acts as an optical input for the modulator 2502, the wavelength of which is selected by the laser wavelength tuner module 2511 of the electronic circuit. The module 2511 which includes the wavelength tuner may include a laser driver as shown in FIGS. 8 and 9 although it is also envisaged that the laser driver could be located outside of the electronic circuit (not shown).

The electronic circuit 2503 receives an electrical input from the detector 2501 which is first amplified by an amplification unit 2505 which may take the form of a transimpedance amplifier (TIA) and acts to provide gain to the electrical packet signal generated by the detector, and conversion from current to voltage.

Once gain has been provided, the electrical signal is decoded by a Physical Coding Sublayer (PCS) and a Physical Medium Attachment (PMA) which is responsible for the serialisation of the incoming data. 2506. The PMA effectively regenerates the signal.

The output of the PCS/PMA 2506 is connected to the input of a framer 2507 which identifies the frames in the signal. The first copy of the frame is sent to a packet processor 2508 which determines the desired output port for the packet and sends this information to the external switch control unit 2510.

The switch control unit includes a scheduler (not shown) which constructs a schedule of how packets are to traverse the passive optical router. The scheduler sends this schedule to a finite state machine (FSM) 2509. Based on the schedule, the FSM generates control signals which instruct the laser wavelength tuner 2511 to set the appropriate wavelength of the tunable laser 2504. The appropriate wavelength is the wavelength required for the path of the modulated optical signal through the passive optical router to exit the passive optical router at a desired output port. The schedule sent to the FSM from the scheduler will take into account the paths of other packets through the passive optical router at the same time.

The second copy of the frame which has been generated by the framer 2507 is sent to an SRAM packet queue 2512, where the frame is buffered until a control signal from the FSM 2509 indicates that the frame is to be transmitted. The addition of buffers allows higher throughput (bits or bytes per second) through the switch by solving the problem of allowing packets destined to the same output port to be delayed until the output port is no longer in use.

Once transmitted from the SRAM packet queue 2512, the frame is sent to a second framer 2513, recoded into the desired format and serialized at a second PCS/PMA 2514 and then sent to the modulator 2502 via modulator driver 2516.

An alternative DRM 2600 is shown in FIG. 9 where like reference numbers correspond to those features described above in relation to FIG. 8. The embodiment in FIG. 9 differs from that of FIG. 8 in that the packet processor is located within the switch control unit and therefore outside of the electronic circuit 2603. In this embodiment, a copy of the frame is sent directly to the switch control unit 2610 from the first framer 2607 so that header processing of the packet and scheduling both take place within the switch control unit, i.e. outside of the DRM.

A further example of a DRM, in this case suitable for use in an optoelectronic circuit switch, is shown in FIG. 10. Like reference numbers correspond to those features described above in relation to FIGS. 8 and 9.

The DRM 2700 comprises: a detector 2701, a modulator 2702, and an electronic circuit 2703 which forms an electrical connection between the detector and the modulator via only mainly analogue/mixed signal circuitry without going into the digital domain. A tunable laser 2704 is located outside of the electronic circuit as a separate component from the modulator 2702 and provides the modulator with a wavelength tuned but unmodulated laser signal.

The electronic circuit includes laser wavelength tuner module 2711 configured to send tuning signals to the tunable laser. The tunable laser is configured to generate a wavelength tuned (but unmodulated) laser light signal which acts as an optical input for the modulator 2702, the wavelength of which is selected by the laser wavelength tuner module 2711 of the electronic circuit. The module 2711 which includes the wavelength tuner may include a laser driver as shown in FIG. 8 although it is also envisaged that the laser driver could be located outside of the electrical circuit (not shown).

The electronic circuit 2703 receives an electrical input from the detector 2701, and the electrical input is first amplified by an amplification unit 2705 which may take the form of a transimpedance amplifier (TIA) and acts to provide gain to the electrical packet signal generated by the detector, and conversion from current to voltage.

Once gain and voltage conversion has been provided, the electrical signal is then optionally sent to a regenerator 2706 which provides additional reshaping and retiming to the signal, and prepares the signal to have sufficient magnitude and quality to input to the modulator driver and generate an optical signal of desired quality.

The switch control unit 2710 directly controls the modulator driver and the wavelength tuner module using external inputs.

The signal is then sent to the modulator 2702 via modulator driver 2716.

The electronic circuits described above in relation to FIGS. 8 to 10 could form the integrated circuit of any one of the embodiments described in relation to FIGS. 4 to 7.

Figure 11:
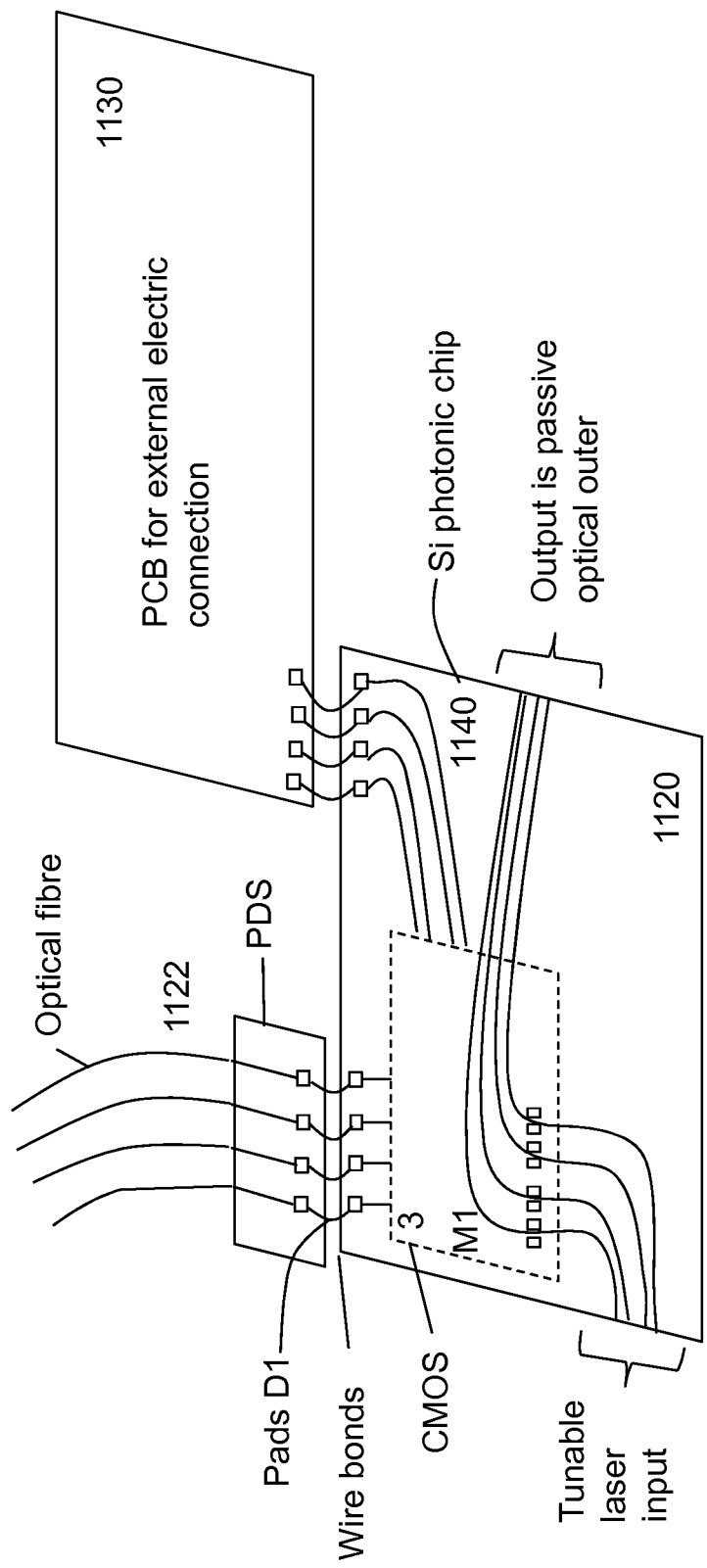
FIG. 11 is a schematic diagram of an alternative optical waveguide device.

An alternative embodiment of an optical waveguide device is described in relation to FIG. 11. Photodetectors (1122) are arranged in an array on a chip which is separate from the modulators. The CMOS chip 3 is a flip chip to connect the modulators to the PCB 1130 through RF transmission lines 1140. Both modulators and RF transmission lines are integrated in the silicon photonics chip 1120. This embodiment differs from that shown in FIG. 4 in that the output electrical lines from the photodectors are wire bonded to pads on the silicon photonics chip (1120) adjacent to and hence connected to the IC (CMOS chip 3). In such an arrangement electronic functions (in addition to those carried out on the IC) will be carried out on an adjacent PCB (1130) whose input pads are wire bonded to the RF interconnect transmission lines (1140) which connect to the IC (CMOS chip 3). Note that only one bonding wire is used for illustration purpose for each pair of bonding pads, but there could be two bonding wires (ground-signal) or three bonding wires (ground-signal-ground) for each pair of the bonding pads. There are 4 photodetectors shown in the photodetector array (1122) of FIG. 11 for illustration purpose, but it is envisaged that there could be more than 4 photodetectors. Similarly, for the RF interconnect transmission lines, only 4 lines and 4 pads are used for illustration purpose. Again, it is envisaged that there could be more than 4. The total number of lines and pads will depend upon how many lines and pads would be necessary for connecting the CMOS chip 3 to the PCB 1130. In addition, there are other DC lines (not shown in FIG. 11) that connect the CMOS chip 3 and PCB 1130 for DC power supply.

Figure 12:
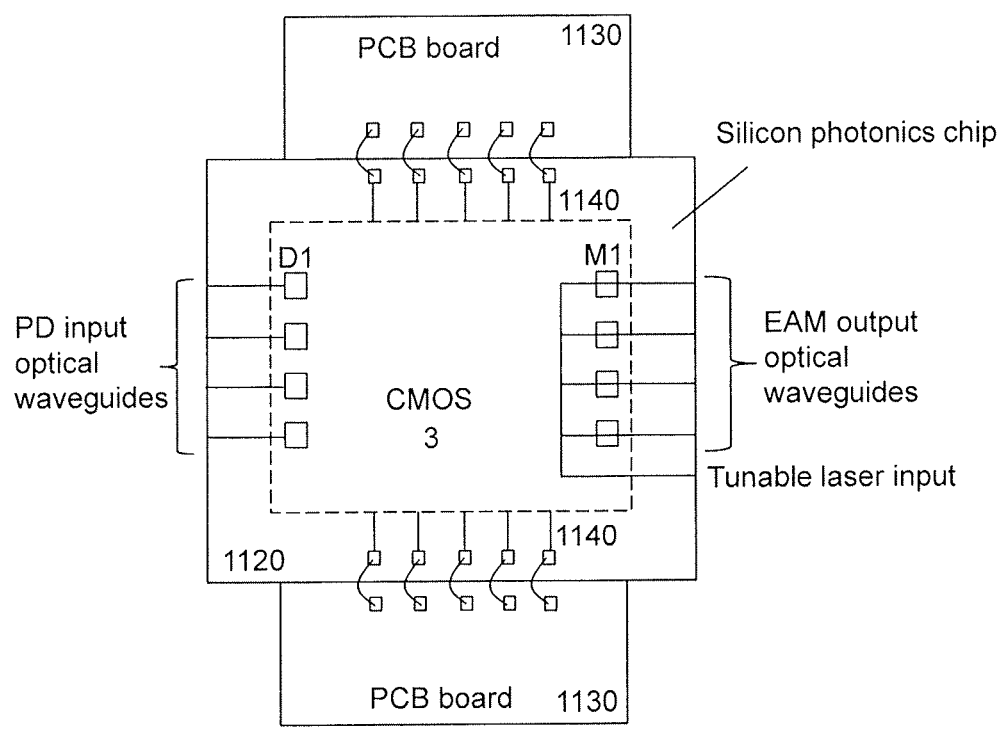
FIG. 12 is a schematic diagram of a further alternative optical waveguide device.

FIG. 12 shows a further embodiment in which the CMOS chip 3 is flip-chip bonded to the photonics chip 1120 to connect the modulators, photodetectors and RF transmission lines 1140. The transmission lines are connected to PCB boards 1130 through wire-bonding. Only one bonding wire is used for illustration purpose for each pair of bonding pads, but it can be two bonding wires (ground-signal) or three bonding wires (ground-signal-ground) for each pair of the bonding pads. There are only 4 photodetectors and 4 modulators used for illustration purpose, but there could be a plurality of photodetectors and modulators. The detectors and the modulators lie vertically underneath the integrated circuit.

Figure 13:
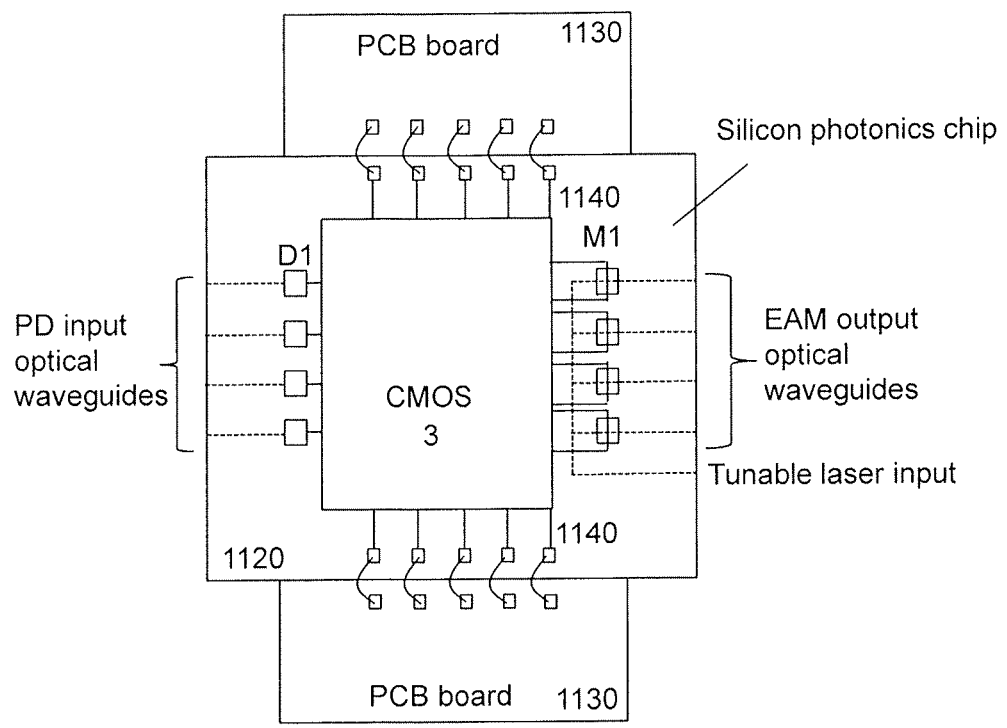
FIG. 13 is a schematic diagram of another alternative optical waveguide device.

A further embodiment can be understood in relation to FIG. 13. As with the embodiment of FIG. 13, the detectors and the modulators are located on the same photonic chip as one another. The embodiment of FIG. 14 differs from that of FIG. 13 in that, whilst the integrated circuit 3 is still located on top of the photonics chip 1120, it does not vertically overlap the detectors D1 or the modulators M1. Instead, the integrated circuit 3 is located on top of an area of the photonic chip which lies between the detectors and the modulators.

Figure 14:
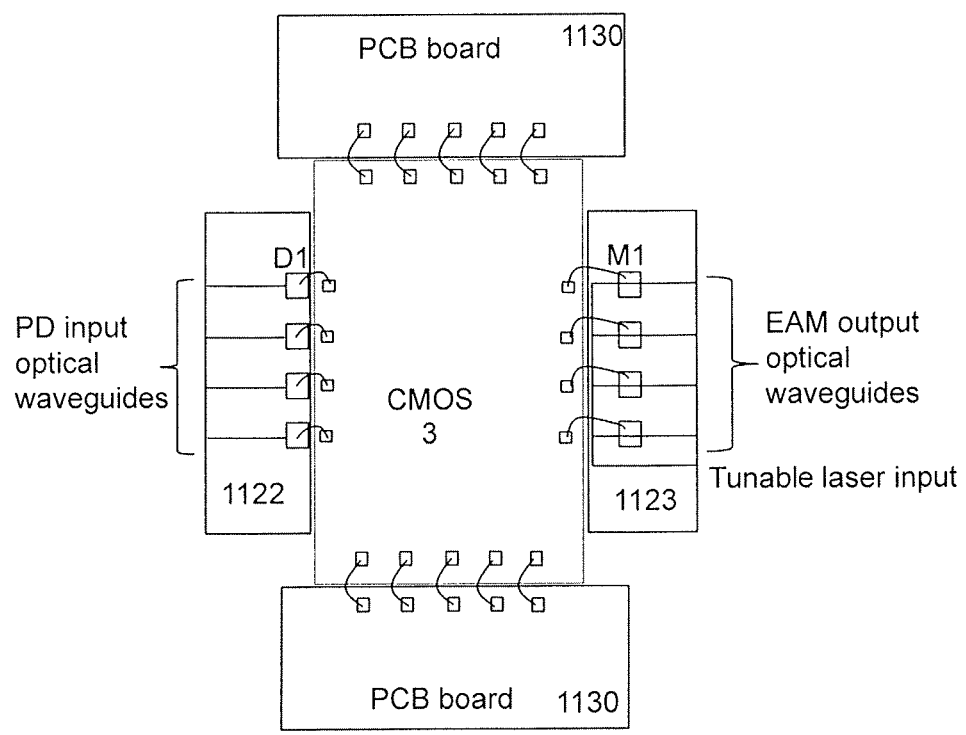
FIG. 14 is a schematic diagram of yet another alternative optical waveguide device.
Figure 15:
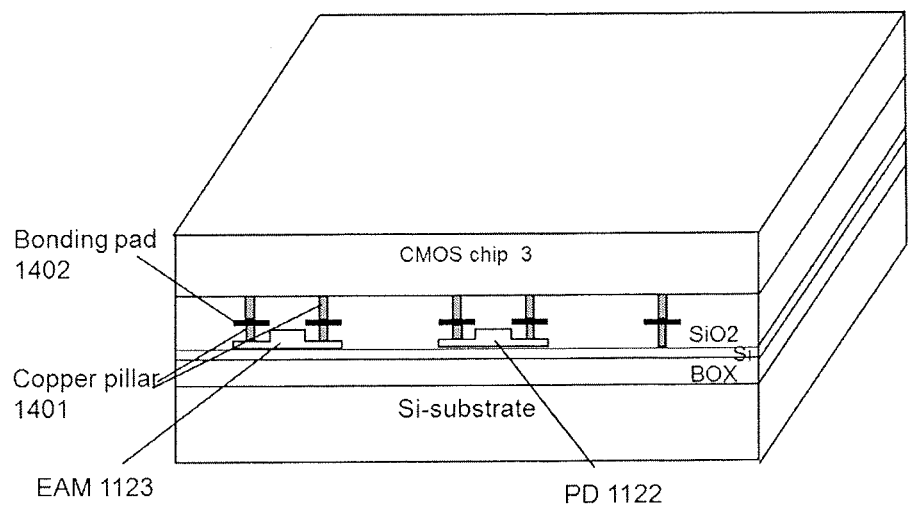
FIG. 15 is a schematic diagram of flip chip bonding showing a cross section of a flip chip.

FIG. 14 shows another embodiment in which the detectors D1 are located on a first photonics chip 1122, the modulators are located on a second photonics chip 1123, and the integrated circuit 3 is located between the first photonics chip and the second photonics chip. The integrated circuit chip is located adjacent to the first and second photonic chips rather than above them. The integrated circuit chip 3 is wire-bonded to photodetectors 1122, modulators 1123 and PCB boards 1130. Only one bonding wire is used for illustration purpose for each pair of bonding pads, but it can be two bonding wires (ground-signal) or three bonding wires (ground-signal-ground) for each pair of the bonding pads. There are only 4 photodetectors and 4 modulators used for illustration purpose, but the photodetectors and modulators can be more. FIG. 15 shows the cross section of CMOS chip flip-chip bonded to photonics chip that consist of modulator 1123, photodetector 1122 and RF transmission lines. The photonics chip is built on a Si substrate with a layer of BOX (buried oxide) and a layer of SOI (silicon on insulator). Between the CMOS chip and the photonics chip, there is a layer of SiO2 in which the copper pillars and bonding pads are made to realize the high speed interconnection. The copper pillars and bonding pads 1402 are arranged in coplanar.

Figure 16A:
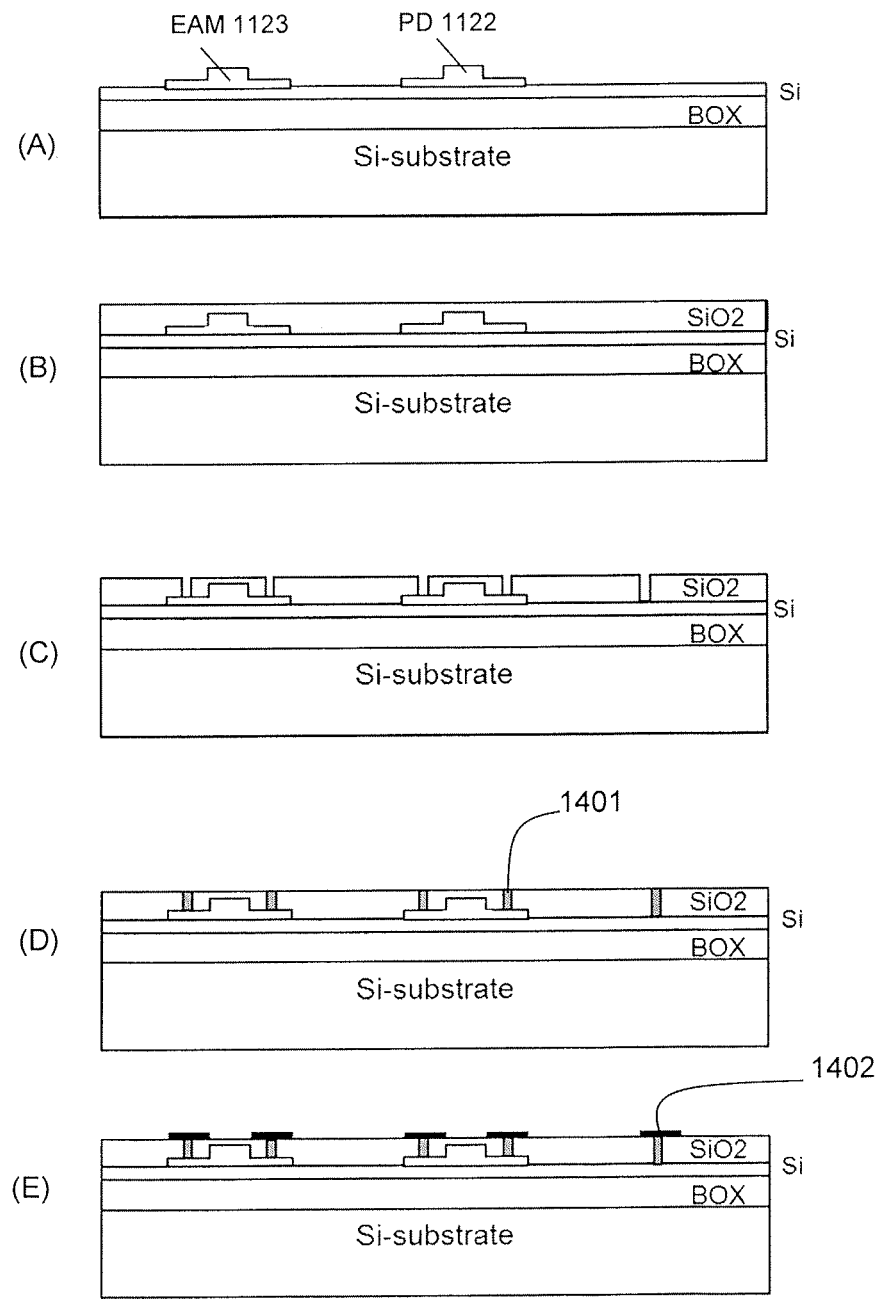
FIGS. 16a and 16b show the flip chip fabrication processes that combines the photonic chip and CMOS chip together.
Figure 16B:
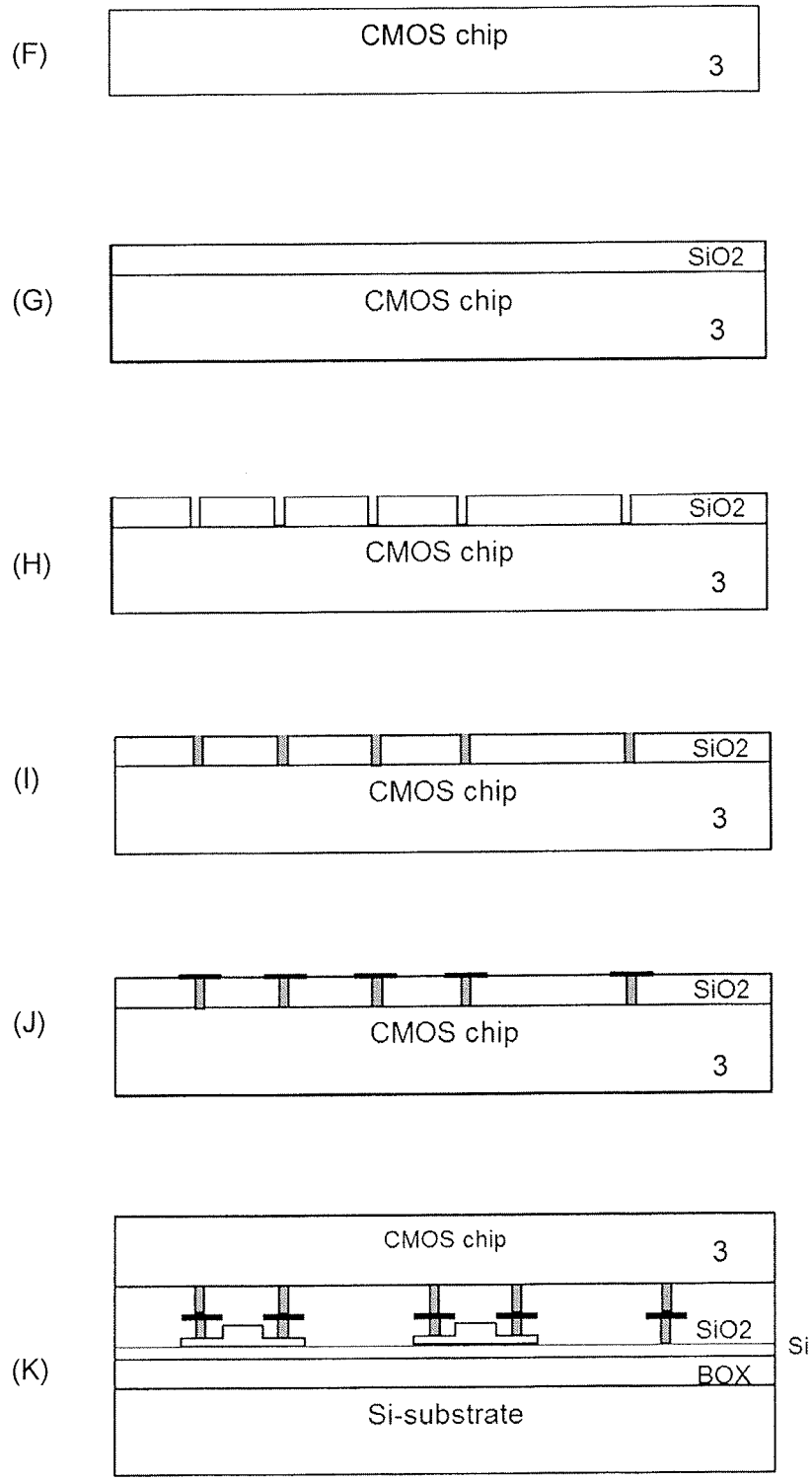

An example of a flip-chip fabrication processes is illustrated in 11 steps. FIG. 16a depicts the first five steps (steps A to E) and FIG. 16b depicts the next 11 steps (steps F to K). In step A, a photonic chip consisting of a photodetector 1122, an EAM 1123 and a RF transmission line (not shown) is ready for flip-chip bonding preparation processing. In step B, a layer of SiO2 is deposited. The thickness of the SiO2 layer is about 1~1.5 microns. In Step C, vias are made to expose the contact pads of EAM, photodetector and transmission line. The vias typically have a circular shape with a diameter of 2-3 um. The vias can also be square, hexagon or any shape as long as it can be made by photolithography. In step D, contact metal pillars 1401 are made by filling the vias with desired metal. The metal can copper (Cu), tungsten (W), nickel (Ni), or any other conductive metals. In step E, the bonding pads 1402 are fabricated. The metal used for the bonding pads is titanium (Ti), but it can be Ni, Cu, W or any other conductive metal. The bonding pads typically have a circular shape with a diameter of 5-6 um. The bonding pads can also be square, hexagon or any shape as long as it can be made by photolithography. Up to step E, the photonics chip is prepared for flip-chip bonding.

In step F, the CMOS chip is ready for flip-chip bonding preparation processing. In step G, a layer of SiO2 is deposited. The thickness of the SiO2 layer is about 1~1.5 microns. In step H, Vias are made to expose the contact pads on CMOS chip. The vias typically have a circular shape with a diameter of 2-3 um. The vias can also be square, hexagon or any shape as long as it can be made by photolithography. In step I, contact metal pillars are made by filling the vias with desired metal. The metal can copper (Cu), tungsten (W), nickel (Ni), or any other conductive metals. In step J, the bonding pads are fabricated. The metal used for the bonding pads is titanium (Ti), but it can be Ni, Cu, W or any other conductive metal. The bonding pads typically have a circular shape with a diameter of 5-6 um. The bonding pads can also be square, hexagon or any shape as long as it can be made by photolithography. Up to step J, the CMOS chip is prepared for flip-chip bonding.

In step K, the prepared CMOS chip is flipped and bonded to the photonics chip by aligning and connecting the bonding pads together (i.e. by bringing the bonding pads of the CMOS chip into alignment with the respective bonding pads of the photonics chip). All the pillars are arranged in a coplanar configuration and the bonding pads are arranged in a coplanar configuration.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An optical waveguide device comprising:
one or more photonic chips, the one or more photonic chips including:
a first portion of a photonic chip comprising an array of first components, each of the first components having an optical input and an electrical output; and
a second portion of a photonic chip comprising:
an array of second components each having an electrical input and an optical output, and
a plurality of output waveguides each connected to the optical output of a respective second component,
the second components and the output waveguides being within one plane parallel to a surface of the second portion of a photonic chip;
the optical waveguide device further comprising a complementary metal oxide semiconductor (CMOS) integrated circuit, the CMOS integrated circuit forming an electrical bridge between the electrical outputs of the first components and respective electrical inputs of the second components;
wherein the CMOS integrated circuit is configured:
to receive a first electrical signal corresponding to modulation carried by light received by a first one of the first components,
to process the first electrical signal to form a first processed electrical signal, the processing comprising reshaping and/or retiming of the electrical signal, and
to provide the first processed electrical signal to a first one of the second components,
wherein the CMOS integrated circuit has a perimeter having:
a first side, and
a second side, different from the first side,
wherein each of a plurality of electrical contacts on the first side is connected to the electrical output of a respective first component of the array of first components, and no electrical contact on the first side is connected to a modulator,
wherein each of a plurality of electrical contacts on the second side is connected to the electrical input of a respective second component of the array of second components, and no electrical contact on the second side is connected to a photodetector,
wherein the second components are modulators, each having an input waveguide and an output waveguide, there being one or more electrical paths between the first components and the modulators and
wherein at least one of the electrical paths extends over:
an input waveguide;
an output waveguide; or
a modulator.

2. The optical waveguide device of claim 1, wherein the integrated circuit is directly mounted onto the first portion of a photonic chip and/or the second portion of a photonic chip.

3. The optical waveguide device according to claim 1, wherein each of the first components is a photodetector.

4. The optical waveguide device according to claim 1, wherein the integrated circuit is flip chip mounted onto at least one of the first portion of a photonic chip and the second portion of a photonic chip.

5. The optical waveguide device according to claim 1, wherein the integrated circuit is located between the first portion of a photonic chip and the second portion of a photonic chip; and
wherein the integrated circuit is electrically connected to each of the first components and the second components by respective wire bonds.

6. The optical waveguide device according to claim 1, wherein the first portion of a photonic chip is a portion of a first photonic chip and the second portion of a photonic chip is a portion of a second photonic chip, the second photonic chip being separate from the first photonic chip.

7. The optical waveguide device according to claim 1, wherein the first portion of a photonic chip is a portion of a first photonic chip and the second portion of a photonic chip is a portion of the same photonic chip.

8. The optical waveguide device of claim 7, wherein the integrated circuit is located directly on the photonic chip but does not overlap vertically with either of the first components or the second components.

9. The optical waveguide device according to claim 1, wherein each component in the array of first components is displaced laterally with respect to adjacent first components such that the array of first components has a stepped arrangement.

10. The optical waveguide device of claim 9, wherein each component in the array of second components is displaced laterally with respect to adjacent second components such that the array of second components has a stepped arrangement.

11. The optical waveguide device of claim 10, wherein each of the first components is associated with a respective one of the array of second components, and wherein the length of the electrical connection between each first component and its respective second component is equal to the length of the electrical connection between each of the other first components and their respective second components.

12. The optical waveguide device according to claim 1, wherein the integrated circuit is an application-specific integrated circuit (ASIC).

13. The optical waveguide device of claim 12, wherein the first components are photodetectors, and the integrated circuit is an ASIC which electrically connects the photodetectors with the modulators to form a plurality of detector remodulators.

14. The optical waveguide device of claim 13 wherein the ASIC is configured:
- to receive packets from the photodetectors, and the ASIC includes a packet processor for processing the packet information the ASIC receives from the photodetectors; and
- to process the packet information before sending the electrical signals to the modulators.

15. The optical waveguide device of claim 13, wherein the integrated circuit includes a wavelength tuner configured to control the wavelength of a wavelength tuned laser connected to one or more of the modulators.

16. The optical waveguide device of claim 1,
- wherein the integrated circuit is flip chip mounted onto the first and second portion of a photonic chip; and
- wherein each of the first components is a photodetector.

17. An optical waveguide switch comprising:
- an arrayed waveguide grating (AWG); and
- an optical waveguide device according to claim 1, the optical waveguide device being optically connected to the inputs of the AWG for controlling the wavelength of an optical signal at an input of the AWG and therefore for controlling the path taken by the optical signal through the AWG.

18. The optical waveguide device of claim 1, wherein each of the second components is a modulator configured to receive an unmodulated optical signal at the optical input of the modulator, and to produce, at the optical output of the modulator, a modulated optical signal.

19. The optical waveguide device according to claim 1, wherein the integrated circuit vertically overlaps a first component of the array of first components and/or a second component of the array of second components.

20. The optical waveguide device according to claim 1,
- wherein the integrated circuit is directly mounted onto the one or more photonic chips; and/or
- wherein the integrated circuit is located between the first portion of a photonic chip and the second portion of a photonic chip.

21. The optical waveguide device of claim 1, wherein the CMOS integrated circuit is a packet processing CMOS integrated circuit.

* * * * *